(12) United States Patent
Ranganathan et al.

(10) Patent No.: US 7,976,646 B1
(45) Date of Patent: Jul. 12, 2011

(54) ELECTRONIC GRADE METAL NANOSTRUCTURES

(75) Inventors: Srikanth Ranganathan, Mountain View, CA (US); Paul Bernatis, Sunnyvale, CA (US); Joel Gamoras, Vallejo, CA (US); Chao Liu, San Jose, CA (US); J. Wallace Parce, Palo Alto, CA (US)

(73) Assignee: Nanosys, Inc., Palo Alto, CA (US)

( * ) Notice: Subject to any disclaimer, the term of this patent is extended or adjusted under 35 U.S.C. 154(b) by 1255 days.

(21) Appl. No.: 11/506,769

(22) Filed: Aug. 18, 2006

Related U.S. Application Data

(60) Provisional application No. 60/709,561, filed on Aug. 19, 2005.

(51) Int. Cl.
C22C 5/04 (2006.01)
B32B 15/02 (2006.01)

(52) U.S. Cl. .................... 148/430; 420/462; 428/546

(58) Field of Classification Search .................. None
See application file for complete search history.

(56) References Cited

U.S. PATENT DOCUMENTS

| | | | |
|---|---|---|---|
| 6,391,818 | B1 | 5/2002 | Bonsel et al. |
| 6,723,606 | B2 | 4/2004 | Flagan et al. |
| 7,068,898 | B2 | 6/2006 | Buretea et al. |
| 2003/0065204 | A1 | 4/2003 | Lewis et al. |
| 2003/0092262 | A1 | 5/2003 | Marsh et al. |
| 2003/0134409 | A1 | 7/2003 | Mallouk et al. |
| 2004/0006924 | A1 | 1/2004 | Scott et al. |
| 2004/0053033 | A1 | 3/2004 | Niu et al. |
| 2004/0060477 | A1 | 4/2004 | Iwaki et al. |
| 2004/0144954 | A1 | 7/2004 | Wellinghoff et al. |
| 2004/0262613 | A1 | 12/2004 | Maekawa et al. |
| 2005/0022726 | A1 | 2/2005 | Wong et al. |
| 2005/0063889 | A9 | 3/2005 | Yadav et al. |
| 2005/0074963 | A1 | 4/2005 | Fujii et al. |
| 2005/0109989 | A1 | 5/2005 | Whiteford et al. |
| 2005/0126628 | A1 | 6/2005 | Scher et al. |
| 2005/0201149 | A1 | 9/2005 | Duan et al. |
| 2005/0287717 | A1 | 12/2005 | Heald et al. |
| 2006/0040103 | A1 | 2/2006 | Whiteford et al. |
| 2006/0118853 | A1* | 6/2006 | Takata et al. .................. 257/314 |
| 2006/0204754 | A1* | 9/2006 | Kang ............................ 428/379 |
| 2007/0128501 | A1* | 6/2007 | Alonso-Vante et al. ........ 429/42 |
| 2007/0130656 | A1* | 6/2007 | Boulos et al. ................. 977/840 |

(Continued)

FOREIGN PATENT DOCUMENTS

WO WO-2005023923 3/2005

OTHER PUBLICATIONS

Ahmadi et al. "'Cubic' colloidal platinum nanoparticles" Chem Mater (1996) 8:1161-1163.

(Continued)

*Primary Examiner* — George Wyszomierski
(74) *Attorney, Agent, or Firm* — Quine Intellectual Property Law Group, P.C.; Monicia Elrod-Erickson; Andrew L. Filler (57) ABSTRACT

Methods for producing electronic grade metal nanostructures having low levels of contaminants are provided. Monolayer arrays, populations, and devices including such electronic grade nanostructures are described. In addition, novel methods and compositions for production of Group 10 metal nanostructures and for production of ruthenium nanostructures are provided, along with methods for recovering nanostructures from suspension.

37 Claims, 3 Drawing Sheets

U.S. PATENT DOCUMENTS

2009/0297924 A9* 12/2009 Shimazaki et al. .............. 429/44
2010/0159305 A1* 6/2010 Yan et al. ......................... 429/44

OTHER PUBLICATIONS

Ahmadi et al. "Shape-controlled synthesis of colloidal platinum nanoparticles" Science (1996) 272:1924-1926.

Bock et al. "Size-selected synthesis of PtRu nano-catalysts: reaction and size control mechanism" J. Am. Chem. Soc. (2004) 126:8028-8037.

Gugliotti, L.A. et al., "RNA-mediated metal-metal bond formation in the synthesis of hexagonal palladium nanoparticles" Science (2004) 304:850-852.

Ingelsten et al. "Kinetics of the formation of nano-sized platinum particles in water-in-oil microemulsions" J Colloid Interface Science (2001) 241:104-111.

Kim et al. "Synthesis of monodisperse palladium nanoparticles" Nano Letters (2003) 3:1289-1291.

Magnusson et al. "Gold nanoparticles: Production, reshaping, and thermal charging" J. Nanoparticles Res.(1999) 1:243-251.

Pirmettis et al. "Synthesis and characterization of oxotechnetium(V) mixed-ligand complexes containing a tridentate N-substituted bis(2-mercaptoethyl)amine and a monodentate thiol" Inorg Chem (1996) 35:1685-1691.

Son et al. "Facile synthesis of various phosphine-stabilized monodisperse palladium nanoparticles through understanding of coordination chemistry of the nanoparticles" Nano Letters (2004) 4:1147-1151.

Thomas et al. "From colloids to nanotechnology: Investigations of magic nuclearity palladium nanocrystals" Curr Sci (2003) 85:1760-1766.

Vargaftik, M.N. et al., "A Novel Giant Palladium Cluster" J. Chem. Soc. Chem. Commun. (1985) 937-939.

Viau, G. et al., "Ruthenium nanoparticles: size, shape, and self-assemblies" Chem. Mater. (2003) 15:486-494.

Yee et al. One-phase synthesis of thiol-functionalized platinum nanoparticles Langmuir (1999) 15:4314-4316.

* cited by examiner

ELECTRONIC GRADE METAL NANOSTRUCTURES

CROSS-REFERENCE TO RELATED APPLICATIONS

This application is a non-provisional utility patent application claiming priority to and benefit of the following prior provisional patent application: U.S. Ser. No. 60/709,561, filed Aug. 19, 2005, entitled "ELECTRONIC GRADE METAL NANOSTRUCTURES" by Srikanth Ranganathan et al., which is incorporated herein by reference in its entirety for all purposes.

FIELD OF THE INVENTION

The invention pertains to the field of nanotechnology. More particularly, the invention relates to methods for producing and processing metal nanostructures, compositions useful in producing metal nanostructures, and compositions including metal nanostructures.

BACKGROUND OF THE INVENTION

Metal nanostructures have uses ranging from catalysts and adsorbants to components of various optoelectronic devices. The properties of such nanostructures (e.g., their catalytic reactivity or their electrical and optical properties) vary, e.g., depending on their composition, size, and shape. Methods for simply and reproducibly producing metal nanostructures, e.g., of different sizes and/or shapes, are thus desirable. Methods for simply and reproducibly producing metal nanostructures containing minimal levels of undesirable contaminants are also desirable. Among other aspects, the present invention provides such methods. A complete understanding of the invention will be obtained upon review of the following.

SUMMARY OF THE INVENTION

Methods for producing metal nanostructures having low levels of contaminants are provided. Monolayer arrays and populations including such nanostructures are described. Novel methods and compositions for production of Group 10 metal nanostructures and ruthenium nanostructures are also provided, along with methods for recovering nanostructures from suspension.

A first general class of embodiments provides methods for production of metal nanostructures. In the methods, a precursor comprising a metal atom is provided and reacted to produce the nanostructures. In the resulting nanostructures, a ratio of the metal atom to each of one or more atoms selected from the group consisting of Cu, Fe, Cr, Zn, Ti, Mn, Au, Na, and K is greater than 1,000:1.

The metal atom can be essentially any desired metal atom. In one class of embodiments, the metal atom is a Group 10 atom such as Pd, Pt, or Ni, or is selected from the group consisting of W, Ru, Ta, Co, Mo, Ir, Re, Rh, Hf, and Nb. The metal nanostructures can thus be essentially any desired metal, including but not limited to, Pd, Pt, Ni, W, Ru, Ta, Co, Mo, Ir, Re, Rh, Hf, Nb, or an alloy thereof. The metal atom is typically other than Cu, Fe, Cr, Zn, Ti, Mn, Au, Na, or K.

In one class of embodiments, in the nanostructures the ratio of the metal atom to each of two or more, three or more, four or more, five or more, six or more, seven or more, or eight or more atoms selected from the group consisting of Cu, Fe, Cr, Zn, Ti, Mn, Au, Na, and K can be greater than 1,000:1. Further, the ratio of the metal atom to each of Cu, Fe, Cr, Zn, Ti, Mn, Au, Na, and K is optionally greater than 1,000:1.

The ratio of the metal atom to a given contaminant is optionally greater than 1,000:1. For example, in one class of embodiments, in the nanostructures the ratio of the metal atom to each of one or more atoms (e.g., to each of two or more, three or more, four or more, five or more, six or more, seven or more, or eight or more atoms) selected from the group consisting of Cu, Fe, Cr, Zn, Ti, Mn, Au, Na, and K is greater than 5,000:1. Optionally, the ratio of the metal atom to each of Cu, Fe, Cr, Zn, Ti, Mn, Au, Na, and K is greater than 5,000:1 in the nanostructures. In another class of embodiments, in the nanostructures the ratio of the metal atom to each of one or more atoms (e.g., to each of two or more, three or more, four or more, five or more, six or more, seven or more, or eight or more atoms) selected from the group consisting of Cu, Fe, Cr, Zn, Ti, Mn, Au, Na, and K is greater than 10,000:1. The ratio of the metal atom to each of Cu, Fe, Cr, Zn, Ti, Mn, Au, Na, and K is optionally greater than 10,000:1. In yet another class of embodiments, in the nanostructures the ratio of the metal atom to each of one or more atoms (e.g., to each of two or more, three or more, four or more, five or more, six or more, seven or more, or eight or more atoms) selected from the group consisting of Cu, Fe, Cr, Zn, Ti, Mn, Au, Na, and K is greater than 100,000:1. Optionally, the ratio of the metal atom to each of Cu, Fe, Cr, Zn, Ti, Mn, Au, Na, and K in the nanostructures is greater than 100,000:1.

Essentially any desired combination of contaminating atoms can be limited to essentially any desired level. Thus, in one exemplary class of embodiments, in the nanostructures the ratio of the metal atom to Cu is greater than 100,000:1 and the ratio of the metal atom to Fe is greater than 100,000:1. Similarly, in an exemplary class of embodiments, in the nanostructures the ratio of the metal atom to Fe is greater than 10,000:1, the ratio of the metal atom to Zn is greater than 10,000:1, the ratio of the metal atom to Cu is greater than 50,000:1, and the ratio of the metal atom to K is greater than 50,000:1. In one class of embodiments, in the nanostructures the ratio of the metal atom to Na is greater than 100,000:1. In certain embodiments, in the nanostructures the ratio of the metal atom to K is greater than 100,000:1. Levels of additional contaminating metals can be limited as desired. For example, in one class of embodiments, the metal atom is Pd, and in the Pd nanostructures a ratio of Pd to Ni is greater than 1,000:1, greater than 5,000:1, greater than 10,000:1, greater than 50,000:1, or greater than 100,000:1.

A variety of precursors and techniques for nanostructure synthesis are known in the art and can be adapted to the practice of the present invention. Exemplary precursors for synthesis of Group 10 metal nanostructures include, but are not limited to, precursors in which the Group 10 atom has an oxidation state of +2. The Group 10 atom is optionally bonded to one or more oxygen atoms, e.g., to one or more carboxylate or beta diketone moieties (for example, one or more acetate, butyrate, or oxanilate moieties). In one class of embodiments, the precursor is palladium (II) acetate. Exemplary precursors for synthesis of ruthenium nanostructures include, but are not limited to, ruthenium (III) acetylacetonate and ruthenium chloride. The precursor is optionally reacted in the presence of an oxidizing agent, a base, a carboxylate, or an acetate (e.g. ammonium nitrate, nitric acid, hydrogen peroxide, ammonium acetate, tetramethylammonium acetate, ammonium hydroxide, or tetramethylammonium hydroxide) to produce the Ru nanostructures.

To produce the nanostructures, the precursor can be reacted in the presence of a surfactant, e.g., a phosphine, a thiol, or a carboxylic acid. Similarly, the precursor is optionally reacted in the presence of a non-coordinating solvent, e.g., an alkane or an unreactive aromatic hydrocarbon.

To minimize the amount of Cu, Fe, Cr, Zn, Ti, Mn, Au, Na, K, and/or other contaminants present in the resulting nanostructures, the amount of these elements present in the precursor and in any other reagents used in synthesizing and processing the nanostructures is preferably minimized. Accordingly, in one class of embodiments, the methods include determining an amount of one or more of Cu, Fe, Cr, Zn, Ti, Mn, Au, Na, and K present in the precursor, in a surfactant, in a non-coordinating solvent and/or in any other reagent(s) used to synthesize or process the nanostructures. Similarly, in one aspect, the methods include determining an amount of one or more of the metal atom, Cu, Fe, Cr, Zn, Ti, Mn, Au, Na, and K present in the nanostructures.

The amount of Cu, Fe, Cr, Zn, Ti, Mn, Au, Na, and/or K present in the resulting nanostructures can also be minimized by appropriate treatment of any glassware or other implements that contact the reagents and/or nanostructures. Thus, in one class of embodiments, the precursor is reacted in at least one reaction vessel to produce the nanostructures, and the reaction vessel is treated to minimize the amount of Cu, Fe, Cr, Zn, Ti, Mn, Au, Na, and/or K present in the reaction vessel prior to reacting the precursor in the reaction vessel. For example, the reaction vessel can be washed with acid to remove contaminating metals. Since Na and other elements can leach out of borosilicate glass, levels of some contaminants can be further reduced by using quartz glassware. Thus, in one class of embodiments, the at least one reaction vessel comprises quartz glass.

The resulting nanostructures (e.g., nanocrystals) can be of essentially any size and/or shape, including, but not limited to, substantially spherical nanocrystals (e.g., nanodots or quantum dots), nanorods, or branched nanostructures (e.g., bipods, tripods, or nanotetrapods).

A second general class of embodiments provides methods for production of metal nanostructures. In the methods, a precursor and a surfactant are provided. The precursor comprises a metal atom, and the precursor comprises less than 1 ppm of each of one or more atoms selected from the group consisting of Cu, Fe, Cr, Zn, Ti, Mn, Au, Na, and K. Similarly, the surfactant comprises less than 1 ppm of each of one or more atoms selected from the group consisting of Cu, Fe, Cr, Zn, Ti, Mn, Au, Na, and K. The precursor is reacted in the presence of the surfactant to produce the nanostructures.

The precursor and/or the surfactant optionally comprises less than 1 ppm of each of two or more, three or more, four or more, five or more, six or more, seven or more, or eight or more atoms selected from the group consisting of Cu, Fe, Cr, Zn, Ti, Mn, Au, Na, and K. In one class of embodiments, the precursor and/or the surfactant comprises less than 1 ppm of each of Cu, Fe, Cr, Zn, Ti, Mn, Au, Na, and K.

The methods optionally include providing a non-coordinating solvent, which non-coordinating solvent comprises less than 100 ppb of each of one or more atoms selected from the group consisting of Cu, Fe, Cr, Zn, Ti, Mn, Au, Na, and K, and reacting the precursor in the presence of the surfactant and the non-coordinating solvent to produce the nanostructures. The methods optionally include washing the nanostructures with at least one solvent. The at least one solvent preferably comprises less than 100 ppb of each of one or more atoms selected from the group consisting of Cu, Fe, Cr, Zn, Ti, Mn, Au, Na, and K. In one class of embodiments, the methods include determining an amount of one or more of the metal atom, Cu, Fe, Cr, Zn, Ti, Mn, Au, Na, and K present in the nanostructures.

Essentially all of the features noted for the methods above apply to these embodiments as well, as relevant; for example, with respect to type of metal atom, nanostructures, precursor, surfactant, and/or non-coordinating solvent, treatment and/or composition of the reaction vessel, and/or the like.

Another general class of embodiments provides a population of metal nanostructures. The nanostructures comprise a metal atom, and, in the nanostructures, a ratio of the metal atom to each of one or more atoms selected from the group consisting of Cu, Fe, Cr, Zn, Ti, Mn, Au, Na, and K is greater than 1,000:1.

Essentially all of the features noted for the methods above apply to these embodiments as well, as relevant; for example, with respect to type of metal atom, limits on contaminant levels and number of contaminants limited, type of nanostructures, and/or the like. The population of nanostructures is optionally included in a device (e.g., a charge storage device, a memory device, or a photovoltaic device).

Another general class of embodiments provides a monolayer array of metal nanostructures. The nanostructures comprise a metal atom, and a density of the metal atom in the array is greater than $1 \times 10^{15}$ atoms/cm$^2$. A density in the array of each of one or more atoms selected from the group consisting of Cu, Fe, Cr, Zn, Ti, Mn, Au, Na, and K is less than $1 \times 10^{11}$ atoms/cm$^2$.

In one class of embodiments, the density in the array of each of two or more, three or more, four or more, five or more, six or more, seven or more, or eight or more atoms selected from the group consisting of Cu, Fe, Cr, Zn, Ti, Mn, Au, Na, and K is less than $1 \times 10^{11}$ atoms/cm$^2$. Optionally, the density in the array of each of Cu, Fe, Cr, Zn, Ti, Mn, Au, Na, and K is less than $1 \times 10^{11}$ atoms/cm$^2$.

The density of one or more contaminants in the array is optionally even lower. For example, in one class of embodiments, the density in the array of each of one or more atoms (e.g., two or more, three or more, four or more, five or more, six or more, seven or more, or eight or more atoms) selected from the group consisting of Cu, Fe, Cr, Zn, Ti, Mn, Au, Na, and K is less than $1 \times 10^{10}$ atoms/cm$^2$. Optionally, the density of each of Cu, Fe, Cr, Zn, Ti, Mn, Au, Na, and K in the array is less than $1 \times 10^{10}$ atoms/cm$^2$.

Essentially any desired combination of contaminating atoms can be limited to essentially any desired level. Thus, in one exemplary class of embodiments, the one or more atoms having a density in the array of less than $1 \times 10^{11}$ atoms/cm$^2$ comprise Cu and Fe. In a similar exemplary class of embodiments, the one or more atoms having a density in the array of less than $1 \times 10^{11}$ atoms/cm$^2$ comprise Na. Optionally, Cu has a density in the array of less than $1 \times 10^{11}$ atoms/cm$^2$ and/or K has a density in the array of less than $1 \times 10^{11}$ atoms/cm$^2$. Levels of additional contaminating metals can be limited as desired. For example, in one class of embodiments, the metal atom is Pd and a density of Ni atoms in the array of Pd nanostructures is less than $1 \times 10^{11}$ atoms/cm$^2$.

The nanostructures (e.g., nanocrystals) comprising the array can be of essentially any size and/or shape, including, but not limited to, substantially spherical nanocrystals (e.g., nanodots or quantum dots), nanorods, or branched nanostructures (e.g., bipods, tripods, or nanotetrapods). The array is typically a high density array. Thus, in one class of embodiments, the array has a density greater than about $1 \times 10^{11}$ nanostructures/cm$^2$ or greater than about $1 \times 10^{12}$ nanostructures/cm$^2$.

Essentially all of the features noted for the embodiments above apply to these embodiments as well, as relevant; for example, with respect to type of metal atom, inclusion of the array in a device, and/or the like.

Yet another general class of embodiments provides methods for production of Group 10 metal nanostructures. In the methods, a precursor comprising a Group 10 atom selected from the group consisting of Pd, Pt, and Ni, wherein the Group 10 atom has an oxidation state of +2 and is bonded to one or more oxygen atoms, is provided. The precursor is reacted in the presence of a surfactant and a non-coordinating solvent to produce the nanostructures. For example, the precursor and the surfactant can be combined, and then the precursor and the surfactant can be combined with the non-coordinating solvent. Reaction of the precursor optionally occurs without addition of an exogenous reducing agent.

As noted, the Group 10 atom in the precursor is bonded to one or more oxygen atoms, e.g., to two oxygen atoms. Exemplary precursors thus include precursors in which the Group 10 atom is bonded to one or more carboxylate or beta diketone moieties (e.g., to an oxygen atom of the carboxylate or ketone moiety). For example, the Group 10 atom can be bonded to one or more acetate, butyrate, oxanilate, or acetylacetonate moieties (e.g., to two such moieties). In one class of embodiments, the precursor is palladium (II) acetate. In another class of embodiments, the precursor is palladium (II) acetylacetonate.

The methods can be used to produce electronic grade nanostructures having low levels of contaminants. Thus, in one class of embodiments, in the nanostructures a ratio of the Group 10 atom to each of one or more atoms selected from the group consisting of Cu, Fe, Cr, Zn, Ti, Mn, Au, Na, and K is greater than 1,000:1. The methods optionally include determining an amount of one or more of Cu, Fe, Cr, Zn, Ti, Mn, Au, Na, and K present in the precursor, in the surfactant, and/or in the non-coordinating solvent. Similarly, the methods can include determining an amount of one or more of Pd, Pt, Ni, Cu, Fe, Cr, Zn, Ti, Mn, Au, Na, and K present in the nanostructures.

Essentially all of the features noted for the methods above apply to these embodiments as well, as relevant; for example, with respect to limits on contaminant levels and number of contaminants limited, treatment and/or composition of the reaction vessel, washing of the nanostructures, inclusion of the nanostructures in a device, type of surfactant and non-coordinating solvent, and/or the like. It is worth noting that the non-coordinating solvent is optionally present in excess of the surfactant; for example, in one class of embodiments, a volume of the non-coordinating solvent is about ten or more times greater than a volume of the surfactant (e.g., about 20 or more times greater).

Yet another general class of embodiments provides methods for production of ruthenium nanostructures (e.g., nanocrystals). In the methods, ruthenium (III) acetylacetonate is provided and reacted to produce the nanostructures. An additive selected from the group consisting of an oxidizing agent, a carboxylate, an acetate, and a base is optionally provided, and the ruthenium (III) acetylacetonate is reacted in the presence of the additive to produce the nanostructures. Exemplary additives include, but are not limited to, ammonium nitrate, nitric acid, hydrogen peroxide, ammonium acetate, tetramethylammonium acetate, ammonium hydroxide, and tetramethylammonium hydroxide. The resulting nanostructures optionally have a narrow size distribution (e.g., a standard deviation in diameter less than 30% of an average diameter of the nanostructures) and/or have low levels of contaminants.

Essentially all of the features noted for the embodiments above apply to these embodiments as well, as relevant; for example, with respect to type of nanostructures, surfactant, and/or non-coordinating solvent, purity of the nanostructures, and/or the like.

Compositions produced by or useful in practicing the methods are also a feature of the invention. Thus, one general class of embodiments provides a composition including a precursor, a surfactant, and a non-coordinating solvent. The precursor comprises a Group 10 atom selected from the group consisting of Pd, Pt, and Ni; the Group 10 atom has an oxidation state of +2 and is bonded to one or more oxygen atoms. The composition optionally includes one or more Group 10 metal nanostructures. Another general class of embodiments provides a composition including ruthenium (III) acetylacetonate and one or more ruthenium nanostructures. The composition optionally includes an additive selected from the group consisting of an oxidizing agent, a carboxylate, an acetate, and a base. Yet another general class of embodiments provides a composition comprising a population of ruthenium nanostructures (e.g., Ru quantum dots), where the population exhibits a standard deviation in diameter of the Ru nanostructures which is less than 30% (e.g., less than 20%) of an average diameter of the nanostructures, and where the nanostructures are substantially free of sodium.

Essentially all of the features noted for the embodiments above apply to these embodiments as well, as relevant; for example, with respect to type of nanostructures, precursor, additive, surfactant, and/or non-coordinating solvent, purity of the nanostructures, and/or the like.

Yet another general class of embodiments provides methods of recovering nanostructures from suspension. In the methods, a first solution comprising the nanostructures suspended in a solvent is provided. A salt is added to the first solution to produce a second solution, in which second solution the salt is dissolved in the solvent. The nanostructures are separated from the solvent, for example, by centrifuging the second solution at a selected acceleration factor for a selected time.

Preferably, substantially all of the nanostructures are recovered from solution. Thus, in one class of embodiments, at most 5% of the nanostructures remain in the solvent following centrifugation of the second solution at the selected acceleration factor for the selected time. Typically at least 60% of the nanostructures remain in the solvent following centrifugation of the first solution at the selected acceleration factor for the selected time.

In one class of embodiments, the salt comprises a cation selected from the group consisting of: $NH_4^+$, $Cs^+$, $K^+$, $Na^+$, $Li^+$, $Mg^+$, $Ca^+$, $Ba^+$, and a phosphonium ion. In one class of embodiments, the salt comprises an anion selected from the group consisting of: citrate, phosphate, sulfate, acetate, chloride, nitrate, thiocyanate, carbonate, and tetraphenylborate. Exemplary salts include ammonium carbonate, ammonium acetate, and ammonium chloride. In certain embodiments, a volatile salt such as ammonium carbonate or ammonium acetate is preferred. The methods optionally include removing at least a portion of any salt remaining associated with the nanostructures after the centrifugation step, e.g., by volatilizing a volatile salt. The nanostructures are optionally resuspended in fresh solvent and the salt addition and centrifugation steps repeated.

DEFINITIONS

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in the practice for testing of the present invention, the preferred materials and methods are described herein. Accordingly, the terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "a nanostructure" includes a plurality of such nanostructures, and the like.

The term "about" as used herein indicates the value of a given quantity varies by +/−10% of the value, or optionally +/−5% of the value, or in some embodiments, by +/−1% of the value so described.

Two atoms are "bonded to" each other when they share a chemical bond, e.g., a covalent bond, a polar covalent bond, or an ionic bond.

An "alkyl group" refers to a linear (n-alkyl), branched, or cyclic saturated hydrocarbon moiety and includes all positional isomers. Alkyl groups can be, e.g., substituted or unsubstituted.

The term "aryl group" refers to a chemical substituent comprising or consisting of an aromatic group. Exemplary aryl groups include, e.g., phenyl groups, benzyl groups, tolyl groups, xylyl groups, alkyl-aryl groups, or the like. Aryl groups optionally include multiple aromatic rings (e.g., diphenyl groups, etc.). The aryl group can be, e.g., substituted or unsubstituted. In a "substituted aryl group", at least one hydrogen is replaced with one or more other atoms.

The term "alkyl-aryl group" refers to a group that comprises alkyl and aryl moieties.

A "ketone group" is a nonterminal carbonyl group. A ketone has the formula R(CO)R', where R and R' are independent organic groups. A "beta diketone moiety" contains two (or more) ketone groups, where the two ketone groups are spaced one carbon apart.

A "thiol" has the formula RSH, where R is an organic group. Examples include, but are not limited to, an "alkyl thiol", in which R is an alkyl group, an "aryl thiol", in which R is an aryl group, or an "alkylaryl thiol", in which R is an alkylaryl group.

A "phosphine" has the formula PRR'R", where R, R', and R" are independently an alkyl group, acyl group, aryl group (e.g., alkylaryl group), alkenyl group, alkynyl group, ester group, hydrogen, halide, or the like.

A "tri-n-alkyl phosphine" has the formula $PR_3$, where R is an n-alkyl group.

A "tri-alkylaryl phosphine" has the formula $PR_3$, where R is an alkylaryl group.

A "heteroatom" refers to any atom which is not a carbon or hydrogen atom. Examples include, but are not limited to, oxygen, nitrogen, sulfur, phosphorus, and boron.

A "nanostructure" is a structure having at least one region or characteristic dimension with a dimension of less than about 500 nm, e.g., less than about 200 nm, less than about 100 nm, less than about 50 nm, or even less than about 20 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In one aspect, each of the three dimensions of the nanostructure has a dimension of less than about 500 nm, e.g., less than about 200 nm, less than about 100 nm, less than about 50 nm, or even less than about 20 nm.

An "aspect ratio" is the length of a first axis of a nanostructure divided by the average of the lengths of the second and third axes of the nanostructure, where the second and third axes are the two axes whose lengths are most nearly equal each other. For example, the aspect ratio for a perfect rod would be the length of its long axis divided by the diameter of a cross-section perpendicular to (normal to) the long axis.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire or nanorod, a diameter is typically measured across a cross-section perpendicular to the longest axis of the nanowire or nanorod. For spherical nanostructures such as quantum dots, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm, e.g., less than about 200 nm, less than about 100 nm, less than about 50 nm, or even less than about 20 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In one aspect, each of the three dimensions of the nanocrystal has a dimension of less than about 500 nm, e.g., less than about 200 nm, less than about 100 nm, less than about 50 nm, or even less than about 20 nm. Examples of nanocrystals include, but are not limited to, substantially spherical nanocrystals, branched nanocrystals, and substantially monocrystalline nanowires, nanorods, nanodots, quantum dots, nanotetrapods, tripods, bipods, and branched tetrapods (e.g., inorganic dendrimers).

A "substantially spherical nanocrystal" is a nanocrystal with an aspect ratio between about 0.8 and about 1.2.

A "nanorod" is a nanostructure that has one principle axis that is longer than the other two principle axes. Consequently, the nanorod has an aspect ratio greater than one. Nanorods of this invention typically have an aspect ratio between about 1.5 and about 10, but can have an aspect ratio greater than about 10, greater than about 20, greater than about 50, or greater than about 100, or even greater than about 10,000. Longer nanorods (e.g., those with an aspect ratio greater than about 10) are sometimes referred to as nanowires. The diameter of a nanorod is typically less than about 500 nm, preferably less than about 200 nm, more preferably less than about 150 nm, and most preferably less than about 100 nm, about 50 nm, or about 25 nm, or even less than about 10 nm or about 5 nm. Nanorods can have a variable diameter or can have a substantially uniform diameter, that is, a diameter that shows a variance less than about 20% (e.g., less than about 10%, less than about 5%, or less than about 1%) over the region of greatest variability. Nanorods are typically substantially crystalline and/or substantially monocrystalline, but can be, e.g., polycrystalline or amorphous.

A "branched nanostructure" is a nanostructure having three or more arms, where each arm has the characteristics of a nanorod, or a nanostructure having two or more arms, each arm having the characteristics of a nanorod and emanating from a central region that has a crystal structure distinct from that of the arms. Examples include, but are not limited to, bipods, tripods, and nanotetrapods (tetrapods).

A "nanotetrapod" is a generally tetrahedral branched nanostructure having four arms emanating from a central region or core, where the angle between any two arms is approximately 109.5 degrees. Typically, the core has one crystal structure and the arms have another crystal structure.

A "nanostructure array" is an assemblage of nanostructures. The assemblage can be spatially ordered (an "ordered array") or disordered (a "disordered array"). In a "monolayer array" of nanostructures, the assemblage of nanostructures comprises a monolayer.

A "precursor" in a nanostructure synthesis reaction is a chemical substance (e.g., a compound or element) that reacts, e.g., with another precursor, and thereby contributes at least one atom to the nanostructure produced by the reaction.

A "surfactant" is a molecule capable of interacting (whether weakly or strongly) with one or more faces of a nanostructure and/or with one or more precursors used in producing the nanostructure.

A "non-coordinating solvent" is one that does not interact with one or more faces of a nanostructure and/or with one or more precursors used in producing the nanostructure. A typical weakly binding surfactant comprises a heteroatom having a free (non-bonded within the surfactant) pair of electrons, while a typical non-coordinating solvent does not include such a heteroatom and free pair of electrons.

An "oxidizing agent" is a substance that gains one or more electrons in a redox chemical reaction.

A "base" is a substance that can act as a proton acceptor and/or provide a hydroxyl ion.

A "carboxylate" is a salt or anion of a carboxylic acid. Examples include, but are not limited to, an acetate and a glycolate or other carboxylate product of diol oxidation.

A variety of additional terms are defined or otherwise characterized herein.

DETAILED DESCRIPTION

Methods for colloidal synthesis of metal nanostructures, e.g., nanostructures comprising Group 10 metals such as palladium (Pd) or platinum (Pt), have been described. Some of these methods use a precursor containing a metal-oxygen bond, e.g., bis(acetylacetonato)palladium(II) ($Pd(acac)_2$, Kim et al. (2003) "Synthesis of monodisperse palladium nanoparticles" Nano Letters 3:1289-1291). Other methods involve reduction of a halogen-containing metal compound such as $H_2PdCl_4$, $K_2PtCl_4$, or $H_2PtCl_6$ (Yee et al. (1999) One-phase synthesis of thiol-functionalized platinum nanoparticles" Langmuir 15:4314-4316; Ingelsten et al. (2001) "Kinetics of the formation of nano-sized platinum particles in water-in-oil microemulsions" J Colloid Interface Science 241:104-111; Ahmadi et al. (1996) "'Cubic' colloidal platinum nanoparticles" Chem Mater 8:1161-1163; and Ahmadi et al. (1996) "Shape-controlled synthesis of colloidal platinum nanoparticles" Science 272:1924-1926). The synthesis reactions typically include a surfactant such as trioctylphosphine (TOP) or octadecanethiol and/or a polymer (see, e.g., the references above, Son et al. (2004) "Facile synthesis of various phosphine-stabilized monodisperse palladium nanoparticles through understanding of coordination chemistry of the nanoparticles" Nano Letters 4:1147-1151, and Thomas and Kulkarni (2003) "From colloids to nanotechnology: Investigations of magic nuclearity palladium nanocrystals" Curr Sci 85:1760-1766). However, such colloidal synthesis methods can result in nanostructures that include an unacceptably high level of contaminants. See, e.g., Magnusson et al. (1999) "Gold nanoparticles: Production, reshaping, and thermal charging" J. Nanoparticles Res. 1:243-251.

Metal nanostructures for use in a variety of applications preferably include a low level of contaminants. For example, metal nanostructures to be incorporated into electronic devices preferably include low levels of contaminants such as transition metals that encourage electron-hole recombination in silicon and metals that diffuse through insulators such as $SiO_2$ at high temperature, since such contaminants can decrease performance of the resulting devices and/or can contaminate clean rooms in which the devices are fabricated.

In one aspect, the present invention overcomes the above noted difficulties by providing methods for producing metal nanostructures containing very low levels of contaminants. Electronic grade nanostructures which contain only low levels of contaminants are also described, as are arrays and devices incorporating such nanostructures. In addition, novel methods and compositions for production of Group 10 metal nanostructures and for production of ruthenium nanostructures are provided, along with methods for recovering nanostructures from suspension.

Synthesis of Electronic Grade Nanostructures

One aspect of the invention provides methods for synthesizing nanostructures, in particular metal nanostructures, that contain very low levels of other, contaminating metals. These electronic grade nanostructures are suitable, for example, for incorporation into any of a wide variety of electronic devices (or for essentially any other application in which metal nanostructures are desired). Due to their low contaminant levels, such electronic grade nanostructures can be conveniently processed using conventional semiconductor manufacturing technologies.

Thus, one general class of embodiments provides methods for production of metal nanostructures. In the methods, a precursor comprising a metal atom is provided and reacted to produce the nanostructures. In the resulting nanostructures, a ratio of the metal atom to each of one or more atoms selected from the group consisting of copper (Cu), iron (Fe), chromium (Cr), zinc (Zn), titanium (Ti), manganese (Mn), gold (Au), sodium (Na), and potassium (K) is greater than 1,000:1.

The metal atom can be essentially any desired metal atom. For example, the metal atom can be a metal useful in the electronics industry, e.g., a metal that is acceptable for processing in clean rooms, has a desirable work function, is capable of forming good electrical contacts with semiconductors, and/or the like. In one class of embodiments, the metal atom is a Group 10 atom such as palladium (Pd), platinum (Pt), or nickel (Ni), or is selected from the group consisting of tungsten (W), ruthenium (Ru), tantalum (Ta), cobalt (Co), molybdenum (Mo), iridium (Ir), rhenium (Re), rhodium (Rh), hafnium (Hf), and niobium (Nb). The metal atom is typically other than Cu, Fe, Cr, Zn, Ti, Mn, Au, Na, or K, and is optionally other than magnesium (Mg), lithium (Li), aluminum (Al), or gallium (Ga).

As noted above, in the nanostructures a ratio of the metal atom to each of one or more atoms selected from the group consisting of Cu, Fe, Cr, Zn, Ti, Mn, Au, Na, and K is greater than 1,000:1. In one class of embodiments, the amount of any one of the listed metals in the nanostructures is small. Alternatively, levels of more than one contaminant are limited in the nanostructures. Thus, for example, in the nanostructures the ratio of the metal atom to each of two or more, three or more, four or more, five or more, six or more, seven or more, or eight or more atoms selected from the group consisting of Cu, Fe, Cr, Zn, Ti, Mn, Au, Na, and K can be greater than 1,000:1. As just a few examples, the ratio of the metal atom to each of Cu and K, each of Cu, Au, Na, and K, each of Cu, K, Fe, and Zn, or each of Cu, K, Au, Na, Fe, and Zn can be greater than 1,000:1. Further, the ratio of the metal atom to each of Cu, Fe, Cr, Zn, Ti, Mn, Au, Na, and K is optionally greater than 1,000:1.

The ratio of the metal atom to a given contaminant is optionally greater than 1,000:1. For example, in one class of embodiments, in the nanostructures the ratio of the metal atom to each of one or more atoms (e.g., to each of two or more, three or more, four or more, five or more, six or more, seven or more, or eight or more atoms) selected from the group consisting of Cu, Fe, Cr, Zn, Ti, Mn, Au, Na, and K is greater than 5,000:1. Optionally, for example, the ratio of the metal atom to each of Cu and K, each of Cu, Au, Na, and K, each of Cu, K, Fe, and Zn, or each of Cu, K, Au, Na, Fe, and Zn is greater than 5,000:1. Optionally, the ratio of the metal atom to each of Cu, Fe, Cr, Zn, Ti, Mn, Au, Na, and K is greater than 5,000:1 in the nanostructures. In another class of embodiments, in the nanostructures the ratio of the metal atom to each of one or more atoms (e.g., to each of two or more, three or more, four or more, five or more, six or more, seven or more, or eight or more atoms) selected from the group consisting of Cu, Fe, Cr, Zn, Ti, Mn, Au, Na, and K is greater than 10,000:1. As just a few examples, the ratio of the metal atom to each of Cu and K, each of Cu, Au, Na, and K, each of Cu, K, Fe, and Zn, or each of Cu, K, Au, Na, Fe, and Zn can be greater than 10,000:1. The ratio of the metal atom to each of Cu, Fe, Cr, Zn, Ti, Mn, Au, Na, and K is optionally greater than 10,000:1. In another class of embodiments, in the nanostructures the ratio of the metal atom to each of one or more atoms (e.g., to each of two or more, three or more, four or more, five or more, six or more, seven or more, or eight or more atoms) selected from the group consisting of Cu, Fe, Cr, Zn, Ti, Mn, Au, Na, and K is greater than 50,000:1. For example, the ratio of the metal atom to each of Cu and K, each of Cu, Au, Na, and K, each of Cu, K, Fe, and Zn, or each of Cu, K, Au, Na, Fe, and Zn is optionally greater than 50,000:1. Optionally, in the nanostructures the ratio of the metal atom to each of Cu, Fe, Cr, Zn, Ti, Mn, Au, Na, and K is greater than 50,000:1. In yet another class of embodiments, in the nanostructures the ratio of the metal atom to each of one or more atoms (e.g., to each of two or more, three or more, four or more, five or more, six or more, seven or more, or eight or more atoms) selected from the group consisting of Cu, Fe, Cr, Zn, Ti, Mn, Au, Na, and K is greater than 100,000:1. For example, the ratio of the metal atom to each of Cu and K, each of Cu, Au, Na, and K, each of Cu, K, Fe, and Zn, or each of Cu, K, Au, Na, Fe, and Zn is optionally greater than 100,000:1. Optionally, the ratio of the metal atom to each of Cu, Fe, Cr, Zn, Ti, Mn, Au, Na, and K in the nanostructures is greater than 100,000:1. In some embodiments, the ratio of the metal atom to one or more of the contaminants is greater than 200,000:1 or even greater than 400,000:1.

Essentially any desired combination of contaminating atoms can be limited to essentially any desired level. Thus, in one exemplary class of embodiments, the ratio of the metal atom to each of two or more of the listed contaminants is greater than 100,000:1, and the two or more contaminants comprise Cu and Fe. Thus, in this class of embodiments, in the nanostructures the ratio of the metal atom to Cu is greater than 100,000:1 and the ratio of the metal atom to Fe is greater than 100,000:1. Similarly, in an exemplary class of embodiments, the ratio of the metal atom to each of one or more of the listed contaminants is greater than 100,000:1, and the one or more contaminants comprise Na. Thus, in this class of embodiments, in the nanostructures the ratio of the metal atom to Na is greater than 100,000:1. In one class of embodiments, the ratio of the metal atom to K is greater than 100,000:1. As yet another example, the ratio of the metal atom to each of Cu, Fe, and Na can be greater than 100,000:1. In one class of embodiments, in the nanostructures the ratio of the metal atom to Fe is greater than 10,000:1, the ratio of the metal atom to Zn is greater than 10,000:1, the ratio of the metal atom to Cu is greater than 50,000:1, and the ratio of the metal atom to K is greater than 50,000:1 (e.g., greater than 100,000:1).

Levels of additional contaminating metals can be limited as desired. For example, in one class of embodiments, the metal atom is Pd, and in the Pd nanostructures a ratio of Pd to Ni is greater than 1,000:1, greater than 5,000:1, greater than 10,000:1, greater than 50,000:1, or greater than 100,000:1. Similarly, in another class of embodiments, the metal atom is Pd, and in the Pd nanostructures a ratio of Pd to Co is greater than 1,000:1, greater than 5,000:1, greater than 10,000:1, greater than 50,000:1, or greater than 100,000:1.

A variety of precursors and techniques for nanostructure synthesis are known in the art and can be adapted to the practice of the present invention. For example, exemplary precursors for synthesis of Group 10 metal nanostructures are described herein, in the section entitled "Synthesis of Group 10 nanostructures." Additional precursors for synthesis of Group 10 metal nanostructures are described in references herein and in U.S. patent application 60/637,409 filed Dec. 16, 2004 by Jeffery A. Whiteford, et al. entitled "Process for group 10 metal nanostructure synthesis and compositions made using same" and references therein or are known in the art (see, e.g., Bock et al. (2004) "Size-selected synthesis of PtRu nano-catalysts: reaction and size control mechanism" J. Am. Chem. Soc. 126:8028-8037). As another example, exemplary precursors for synthesis of ruthenium nanostructures are described herein, in the section entitled "Synthesis of ruthenium nanostructures." More than one precursor is optionally employed in the reaction. It will be evident that the methods for production of metal nanostructures are not restricted to use of any particular class of precursors; any of the wide variety of precursors known in the art, including, but not limited to, precursors in which the metal atom has an oxidation state from 0 to +7 (e.g., an oxidation state of 0, +2, +3, or +4), can be employed in the methods.

A number of parameters can influence nanostructure growth and can be manipulated, independently or in combination, to control the size and/or shape distribution of the resulting nanostructures. These include, e.g., temperature (e.g., of nanostructure nucleation and/or growth), precursor composition, time-dependent precursor concentration, surfactant composition, surfactant concentration, number of surfactants, and ratio of surfactant(s) to each other and/or to the precursors. For example, precursor concentration can be adjusted to influence the shape of the nanostructures produced, e.g., by increasing or decreasing the amount of precursor initially provided, by introducing additional fresh precursor as the reaction progresses, or the like. As another example, the temperature can be controlled to control the shape and/or size distribution of the resulting nanostructures; e.g., nanostructure growth can be nucleated at a first, nucleation temperature and continued at a second, growth temperature.

Figure 1:
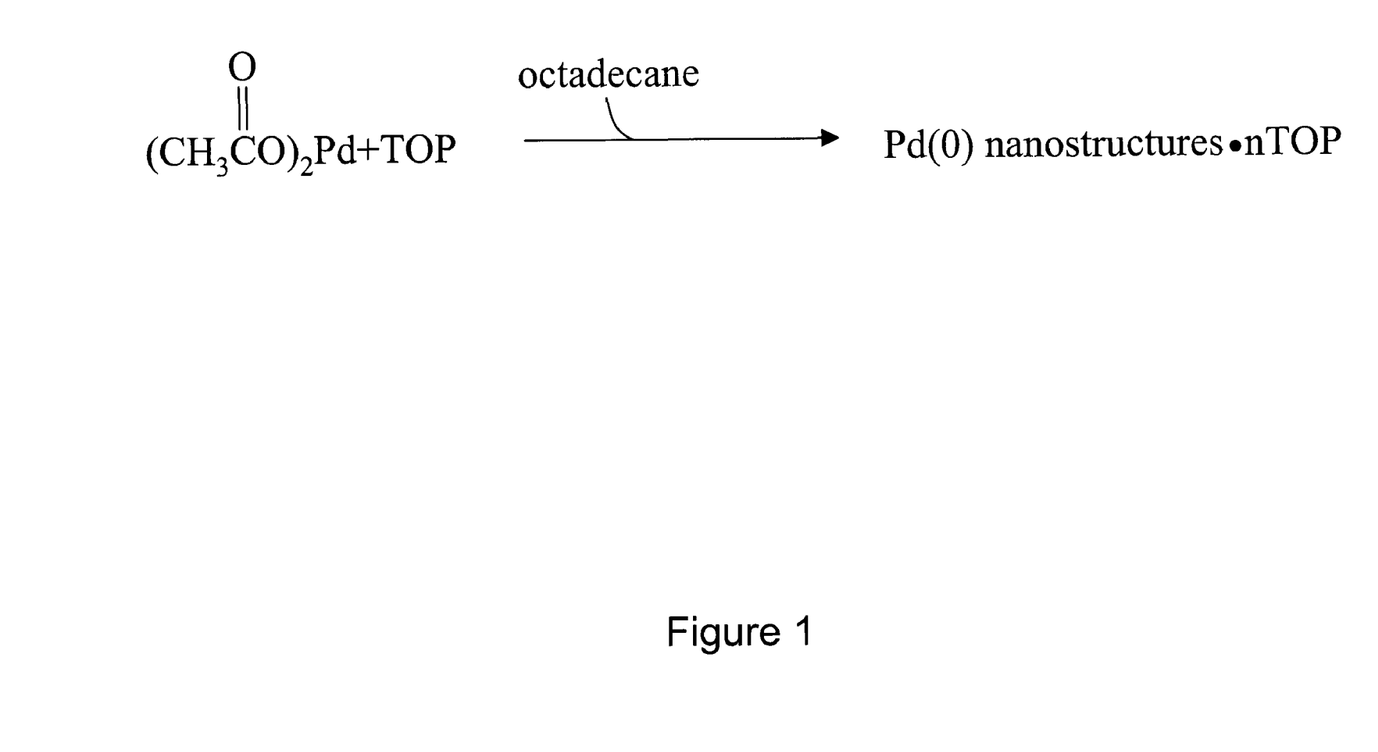
FIG. 1 schematically illustrates synthesis of palladium nanostructures from palladium acetate.

As noted above, to produce the nanostructures, the precursor can be reacted in the presence of a surfactant (including, e.g., a mixture of two or more surfactants). The surfactant can, for example, assist in controlling shape and/or size of the resulting nanostructures, maintain solubility and decrease aggregation of the nanostructures, and/or the like. The precursor is optionally reacted in the presence of a non-coordinating solvent (including, e.g., a mixture of two or more non-coordinating solvents). In one class of embodiments, the precursor is reacted in the presence of a surfactant and a non-coordinating solvent. For example, the precursor can be combined with the surfactant, and then mixed with the non-coordinating solvent. (See, e.g., the exemplary reaction of palladium acetate and TOP and octadecane to form palladium nanostructures that is schematically illustrated in FIG. 1.) Exemplary surfactants and non-coordinating solvents are described below, in the section entitled "Surfactants and non-coordinating solvents."

To minimize the amount of Cu, Fe, Cr, Zn, Ti, Mn, Au, Na, K, and/or other contaminants present in the resulting nanostructures, the amount of these elements present in the precursor and in any other reagents used in synthesizing and processing the nanostructures is preferably minimized. Accordingly, in one class of embodiments, the methods include determining an amount of one or more of Cu, Fe, Cr, Zn, Ti, Mn, Au, Na, and K present in the precursor, in a surfactant, in a non-coordinating solvent and/or in any other reagent(s) used to synthesize or process the nanostructures (e.g., a solvent used to wash or precipitate the nanostructures, e.g., as described in U.S. patent application Ser. No. 10/933, 827 filed Sep. 2, 2004 by Erik Scher, et al., entitled "Methods of processing nanocrystals, and compositions, devices and systems including same"). It will be evident that acceptable limits for the various contaminants in a precursor, surfactant, non-coordinating solvent, or other reagent will vary depending on the synthesis scheme, desired limit of the contaminant in the resulting nanostructures, and/or the like. Typically, however, commercially available electronic grade solvents having less than 100 ppb of each of Cu, Fe, Cr, Zn, Ti, Mn, Au, Na, and/or K (or less than 50 ppb or even less than 10 ppb) are suitable for use. High-quality precursors and surfactants can be purchased or synthesized, and/or reagents can be purified as necessary (e.g., by distillation or crystallization). The methods optionally include verifying that the amount of Cu, Fe, Cr, Zn, Ti, Mn, Au, Na, and/or K determined to be in the precursor, surfactant, and/or non-coordinating solvent is below a predetermined limit (e.g., is less than 10 ppm, less than 1 ppm, less than 100 ppb, less than 50 ppb, or even less than 10 ppb). Manipulations can be performed, e.g., in a glove box dedicated to electronic grade materials work and uncontaminated by extraneous metals, using Schlenk techniques, and/or the like. Materials (e.g., reagents used in the synthesis) optionally contact only plastic, Teflon® (polytetrafluoroethylene), and/or acid-washed glassware.

Similarly, in one aspect, the methods include determining an amount of one or more of the metal atom, Cu, Fe, Cr, Zn, Ti, Mn, Au, Na, and K present in the nanostructures. Reagents (e.g., precursors, surfactants, and solvents) and/or nanostructures can be analyzed for the presence of various elements by any of a variety of techniques known in the art. Exemplary techniques include, but are not limited to, inductively coupled plasma mass spectrometry (ICP-MS, e.g., for detection of any given metal atom(s)), total reflection x-ray fluorescence (TXRF, e.g., for detection of metals other than Na or K), surface secondary ion mass spectrometry (surface SIMS, e.g., for detection of Na or K), and inductively coupled plasma optical emission spectroscopy (ICP-OES).

The amount of Cu, Fe, Cr, Zn, Ti, Mn, Au, Na, and/or K present in the resulting nanostructures can also be minimized by appropriate treatment of any glassware or other implements that contact the reagents and/or nanostructures. Thus, in one class of embodiments, the precursor is reacted in at least one reaction vessel to produce the nanostructures, and the reaction vessel is treated to minimize the amount of Cu, Fe, Cr, Zn, Ti, Mn, Au, Na, and/or K present in the reaction vessel prior to reacting the precursor in the reaction vessel. For example, the reaction vessel can be washed with acid (e.g., with aqua regia, as is well known in the art) to remove contaminating metals. Since Na and other elements can leach out of borosilicate glass, levels of some contaminants can be further reduced by using quartz glassware. Thus, in one class of embodiments, the at least one reaction vessel comprises quartz glass.

The resulting nanostructures (e.g., nanocrystals) can be of essentially any size and/or shape, including, but not limited to, substantially spherical nanocrystals (e.g., nanodots or quantum dots), nanorods, or branched nanostructures (e.g., bipods, tripods, or nanotetrapods). The methods optionally include incorporating the nanostructures into a nanocomposite, a monolayer array, and/or a device, including, but not limited to, a charge storage device, a memory device (e.g., a flash memory device), or a photovoltaic device (e.g., a recombination layer in a multilayer photovoltaic device); see, e.g., U.S. patent application Ser. No. 10/656,916 filed Sep. 4, 2003 by Mihai Buretea et al. entitled "Nanocomposites", U.S. patent application Ser. No. 11/148,001 filed Jun. 7, 2005 by David L. Heald, et al. entitled "Methods and devices for forming nanostructure monolayers and devices including such monolayers", U.S. patent application Ser. No. 10/778,009 filed Feb. 11, 2004 by Erik Scher et al. entitled "Nanostructure and nanocomposite based compositions and photovoltaic devices", and U.S. patent application Ser. No. 11/018,572 by Xiangfeng Duan et al. filed Dec. 21, 2004 entitled "Nano-enabled memory devices and anisotropic charge carrying arrays."

As described above, nanostructures having low levels of contaminants can be produced by synthesizing the nanostructures from precursors having low levels of contaminants, in the presence of surfactants, solvents, and the like also containing few contaminants. Accordingly, a second general class of embodiments provides methods for production of metal nanostructures. In the methods, a precursor and a surfactant are provided. The precursor comprises a metal atom, and the precursor comprises less than 1 part per million (ppm) (e.g., less than 100 parts per billion (ppb)) of each of one or more atoms selected from the group consisting of Cu, Fe, Cr, Zn, Ti, Mn, Au, Na, and K. Similarly, the surfactant comprises less than 1 ppm (e.g., less than 100 ppb) of each of one or more atoms selected from the group consisting of Cu, Fe, Cr, Zn, Ti, Mn, Au, Na, and K. The precursor is reacted in the presence of the surfactant to produce the nanostructures.

The precursor and/or the surfactant optionally comprises less than 1 ppm (e.g., less than 100 ppb) of each of two or more, three or more, four or more, five or more, six or more, seven or more, or eight or more atoms selected from the group consisting of Cu, Fe, Cr, Zn, Ti, Mn, Au, Na, and K. In one class of embodiments, the precursor and/or the surfactant comprises less than 1 ppm (e.g., less than 100 ppb) of each of Cu, Fe, Cr, Zn, Ti, Mn, Au, Na, and K. The amount of contaminating metal(s) in the precursor and/or surfactant can be determined, e.g., by the techniques described above, for the precursor or surfactant in its purest available form (e.g., as purchased, synthesized, distilled, and/or crystallized) prior to its addition to the nanostructure synthesis reaction.

The methods optionally include providing a non-coordinating solvent, which non-coordinating solvent comprises less than 100 ppb (e.g., less than 10 ppb) of each of one or more atoms selected from the group consisting of Cu, Fe, Cr, Zn, Ti, Mn, Au, Na, and K, and reacting the precursor in the presence of the surfactant and the non-coordinating solvent to produce the nanostructures. The non-coordinating solvent optionally includes less than 100 ppb of each of two or more, three or more, four or more, five or more, six or more, seven or more, or eight or more atoms selected from the group consisting of Cu, Fe, Cr, Zn, Ti, Mn, Au, Na, and K, or even less than 100 ppb of each of Cu, Fe, Cr, Zn, Ti, Mn, Au, Na, and K.

Essentially all of the features noted for the methods above apply to these embodiments as well, as relevant; for example, with respect to type of metal atom, nanostructures, precursor, surfactant, and/or non-coordinating solvent, treatment and/or composition of the reaction vessel, and/or the like.

It is worth noting that the methods optionally include washing the nanostructures with at least one solvent. The at least one solvent preferably comprises less than 100 ppb (e.g., less than 50 ppb or less than 10 ppb) of each of one or more atoms selected from the group consisting of Cu, Fe, Cr, Zn, Ti, Mn, Au, Na, and K. The solvent optionally includes less than 100 ppb of each of two or more, three or more, four or more, five or more, six or more, seven or more, or eight or more atoms selected from the group consisting of Cu, Fe, Cr, Zn, Ti, Mn, Au, Na, and K, or even less than 100 ppb of each of Cu, Fe, Cr, Zn, Ti, Mn, Au, Na, and K. In one class of embodiments, the methods include determining an amount of one or more of the metal atom, Cu, Fe, Cr, Zn, Ti, Mn, Au, Na, and K present in the nanostructures. The methods optionally include incorporating the nanostructures into a nanocomposite, an array (e.g., a monolayer array), and/or a device, as described above.

Nanostructures and Related Compositions and Devices

Nanostructures produced and/or processed by any of the methods of the invention form another feature of the invention. As noted, such nanostructures can be, e.g., nanocrystals, substantially spherical nanocrystals, nanorods, branched nanostructures, and/or nanotetrapods, or essentially any other type of nanostructure. Compositions and devices including such nanostructures are also features of the invention.

One general class of embodiments provides a population of metal nanostructures. The nanostructures comprise a metal atom, and, in the nanostructures, a ratio of the metal atom to each of one or more atoms selected from the group consisting of Cu, Fe, Cr, Zn, Ti, Mn, Au, Na, and K is greater than 1,000:1.

Essentially all of the features noted for the methods above apply to these embodiments as well, as relevant; for example, with respect to type of metal atom, limits on contaminant levels and number of contaminants limited, type of nanostructures, and/or the like. The nanostructures can be of essentially any size. In one exemplary class of embodiments, the average diameter is less than 10.0 nm, and is optionally less than 5.0 nm or even less than 4.0 nm. Similarly, the nanostructures can be of essentially any shape. In one preferred class of embodiments, the nanostructures are substantially spherical. A population of nanostructures typically includes at least 10 nanostructures, and more typically includes at least 100, at least $10^3$, at least $10^4$, at least $10^5$, at least $10^{10}$, or at least $10^{15}$ or more nanostructures. The population of nanostructures is optionally dispersed in at least one solvent, disposed on a solid support, formed into an array (e.g., a monolayer array), included in a composition comprising other (metal or non-metal) nanostructures, included in a nanocomposite, and/or included in a device (e.g., a charge storage device, a memory device, or a photovoltaic device).

Another general class of embodiments provides a monolayer array of metal nanostructures. The nanostructures comprise a metal atom, and a density of the metal atom in the array is greater than $1 \times 10^{15}$ atoms/cm$^2$ (e.g., 2-4×$10^{15}$ atoms/cm$^2$ or more). A density in the array of each of one or more atoms selected from the group consisting of Cu, Fe, Cr, Zn, Ti, Mn, Au, Na, and K is less than $1 \times 10^{11}$ atoms/cm$^2$.

In one class of embodiments, the amount of any one of Cu, Fe, Cr, Zn, Ti, Mn, Au, Na, and K is less than $1 \times 10^{11}$ atoms/cm$^2$. Alternatively, the levels of more than one contaminant can be limited in the array. Thus, for example, in one class of embodiments, the density in the array of each of two or more, three or more, four or more, five or more, six or more, seven or more, or eight or more atoms selected from the group consisting of Cu, Fe, Cr, Zn, Ti, Mn, Au, Na, and K is less than $1 \times 10^{11}$ atoms/cm$^2$. Optionally, the density in the array of each of Cu, Fe, Cr, Zn, Ti, Mn, Au, Na, and K is less than $1 \times 10^{11}$ atoms/cm$^2$.

The density of one or more contaminants in the array is optionally even lower. For example, in one class of embodiments, the density in the array of each of one or more atoms (e.g., two or more, three or more, four or more, five or more, six or more, seven or more, or eight or more atoms) selected from the group consisting of Cu, Fe, Cr, Zn, Ti, Mn, Au, Na, and K is less than $5 \times 10^{10}$ atoms/cm$^2$. Optionally, the density of each of Cu, Fe, Cr, Zn, Ti, Mn, Au, Na, and K in the array is less than $5 \times 10^{10}$ atoms/cm$^2$. As another example, in one class of embodiments, the density in the array of each of one or more atoms (e.g., two or more, three or more, four or more, five or more, six or more, seven or more, or eight or more atoms) selected from the group consisting of Cu, Fe, Cr, Zn, Ti, Mn, Au, Na, and K is less than $1 \times 10^{10}$ atoms/cm$^2$. Optionally, the density of each of Cu, Fe, Cr, Zn, Ti, Mn, Au, Na, and K in the array is less than $1 \times 10^{10}$ atoms/cm$^2$. The density of each contaminating atom in the array is optionally low enough that the monolayer array can be processed in a conventional semiconductor compliant clean room or other fabrication facility.

Essentially any desired combination of contaminating atoms can be limited to essentially any desired level. Thus, in one exemplary class of embodiments, the one or more atoms having a density in the array of less than $1 \times 10^{11}$ atoms/cm$^2$ comprise Cu and Fe (i.e., the density of Cu in the array is less than $1 \times 10^{11}$ atoms/cm$^2$ and the density of Fe in the array is less than $1 \times 10^{11}$ atoms/cm$^2$; the density of other contaminants is optionally also less than $1 \times 10^{11}$ atoms/cm$^2$). In a similar exemplary class of embodiments, the one or more atoms having a density in the array of less than $1 \times 10^{11}$ atoms/cm$^2$ comprise Na (i.e., the density of Na, and optionally of other contaminating atom(s), in the array is less than $1 \times 10^{11}$ atoms/cm$^2$). As yet another example, the density of Cu, Fe, and Na can each be less than $1 \times 10^{11}$ atoms/cm$^2$ in the array. Optionally, Cu has a density in the array of less than $1 \times 10^{11}$ atoms/cm$^2$ and/or K has a density in the array of less than $1 \times 10^{11}$ atoms/cm$^2$.

Levels of additional contaminating metals can be limited as desired. For example, in one class of embodiments, the metal atom is Pd and a density of Ni atoms in the array of Pd nanostructures is less than $1 \times 10^{11}$ atoms/cm$^2$ (e.g., less than $5 \times 10^{10}$ atoms/cm$^2$ or even less than $1 \times 10^{10}$ atoms/cm$^2$).

The nanostructures (e.g., nanocrystals) comprising the array can be of essentially any size and/or shape, including, but not limited to, substantially spherical nanocrystals (e.g., nanodots or quantum dots), nanorods, or branched nanostructures (e.g., bipods, tripods, or nanotetrapods). Methods of forming monolayer arrays of nanostructures are known in the art and are described, e.g., in U.S. patent application Ser. No. 11/148,001 (supra). The array can be, e.g., ordered or disordered, and can be of essentially any desired size and/or shape. For example, each nanostructure array can have an area of about $10^4$ μm$^2$ or less, about $10^3$ μm$^2$ or less, about $10^2$ μm$^2$ or less, about 10 μm$^2$ or less, about 1 μm$^2$ or less, about $10^5$ nm$^2$ or less, about $10^4$ nm$^2$ or less, or even about 4225 nm$^2$ or less, about 2025 nm$^2$ or less, about 1225 nm$^2$ or less, about 625 nm$^2$ or less, or about 324 nm$^2$ or less. Each nanostructure array optionally has dimensions of about 45×45 nm or less, about 35×35 nm or less, about 25×25 nm or less, or about 18×18 nm or less.

The array is typically a high density array. Thus, in one class of embodiments, the array has a density greater than about $1 \times 10^{11}$ nanostructures/cm$^2$ or greater than about $1 \times 10^{12}$ nanostructures/cm$^2$ or even greater than about $1 \times 10^{13}$ nanostructures/cm$^2$. For example, the density of the array can be about $2$-$4 \times 10^{12}$ nanostructures/cm$^2$. It will be evident that the density of the nanostructures in the array, the size of the nanostructures, and the density of the metal atoms in the array are correlated. For example, a monolayer array in which Pd quantum dots are present at a density of about $4 \times 10^{12}$ dots/cm$^2$ corresponds to a density of about $4 \times 10^{15}$ Pd atoms/cm$^2$ when each dot includes about 1000 Pd atoms.

Essentially all of the features noted for the embodiments above apply to these embodiments as well, as relevant; for example, with respect to type of metal atom, inclusion of the array in a device, and/or the like.

Synthesis of Group 10 Nanostructures

Among other aspects, the invention provides methods for synthesis of Group 10 metal nanostructures. The Group 10 nanostructures can, but need not be, electronic grade nanostructures. Related compositions are also described.

Thus, one general class of embodiments provides methods for production of Group 10 metal nanostructures. In the methods, a precursor comprising a Group 10 atom selected from the group consisting of Pd, Pt, and Ni, wherein the Group 10 atom has an oxidation state of +2 and is bonded to one or more oxygen atoms, is provided. The precursor is reacted in the presence of a surfactant and a non-coordinating solvent to produce the nanostructures. For example, the precursor and the surfactant can be combined, and then the precursor and the surfactant can be combined with the non-coordinating solvent. Reaction of the precursor optionally occurs without addition of an exogenous reducing agent.

As noted, the Group 10 atom in the precursor is bonded to one or more oxygen atoms, e.g., to two oxygen atoms. Exemplary precursors thus include precursors in which the Group 10 atom is bonded to one or more carboxylate or beta diketone moieties (e.g., to an oxygen atom of the carboxylate or ketone moiety). For example, the Group 10 atom can be bonded to one or more acetate, butyrate, oxanilate, or acetylacetonate moieties (e.g., to two such moieties). In one class of embodiments, the precursor is palladium (II) acetate. In another class of embodiments, the precursor is palladium (II) acetylacetonate.

Exemplary surfactants and non-coordinating solvents are described below, in the section entitled "Surfactants and non-coordinating solvents." The non-coordinating solvent is optionally present in excess of the surfactant; for example, in one class of embodiments, a volume of the non-coordinating solvent is about ten or more times greater than a volume of the surfactant (e.g., about 20 or more times greater). The resulting nanostructures (e.g., nanocrystals) can be of essentially any size and/or shape, including, e.g., substantially spherical nanocrystals (e.g., nanodots or quantum dots), nanorods, or branched nanostructures (e.g., bipods, tripods, or nanotetrapods).

As noted, the methods are optionally used to produce electronic grade nanostructures having low levels of contaminants. Thus, in one class of embodiments, in the nanostructures a ratio of the Group 10 atom to each of one or more atoms selected from the group consisting of Cu, Fe, Cr, Zn, Ti, Mn, Au, Na, and K is greater than 1,000:1. The methods optionally include determining an amount of one or more of Cu, Fe, Cr, Zn, Ti, Mn, Au, Na, and K present in the precursor, in the surfactant, and/or in the non-coordinating solvent. Similarly, the methods can include determining an amount of one or more of Pd, Pt, Ni, Cu, Fe, Cr, Zn, Ti, Mn, Au, Na, and K present in the nanostructures.

Essentially all of the features noted for the methods above apply to these embodiments as well, as relevant; for example, with respect to limits on contaminant levels and number of contaminants limited, treatment and/or composition of the reaction vessel, washing of the nanostructures, inclusion of the nanostructures in a device, and/or the like.

Compositions produced by or useful in practicing the methods are also a feature of the invention. Thus, one general class of embodiments provides a composition including a precursor, a surfactant, and a non-coordinating solvent. The precursor comprises a Group 10 atom selected from the group consisting of Pd, Pt, and Ni; the Group 10 atom has an oxidation state of +2 and is bonded to one or more oxygen atoms. The composition optionally includes one or more Group 10 metal nanostructures.

Essentially all of the features noted for the embodiments above apply to these embodiments as well, as relevant; for example, with respect to type of nanostructures, precursor, surfactant, and/or non-coordinating solvent, purity of the nanostructures, and/or the like.

Synthesis of Ruthenium Nanostructures

In one aspect, the invention provides methods for synthesis of ruthenium nanostructures. The ruthenium nanostructures can, but need not be, electronic grade nanostructures. Related compositions are also provided.

Thus, one general class of embodiments provides methods for production of ruthenium nanostructures (e.g., nanocrystals). In the methods, a precursor comprising an Ru atom (e.g., ruthenium (III) acetylacetonate, ruthenium chloride, or a ruthenocene) is provided and reacted, typically in the presence of an additive such as an oxidizing agent, a base, or a carboxylate (e.g., an acetate) to produce the nanostructures.

In one class of embodiments, ruthenium (III) acetylacetonate is provided and reacted to produce the nanostructures. An additive selected from the group consisting of an oxidizing agent, a carboxylate, an acetate, and a base is optionally provided, and the ruthenium (III) acetylacetonate is reacted in the presence of the additive to produce the nanostructures. Exemplary additives include, but are not limited to, ammonium nitrate, nitric acid, a peroxide, hydrogen peroxide, ammonium acetate, tetramethylammonium acetate, ammonium hydroxide, and tetramethylammonium hydroxide. As for the embodiments above, the precursor can be reacted in the presence of a surfactant and/or a non-coordinating solvent to produce the nanostructures.

The resulting nanostructures (e.g., nanocrystals) can be of essentially any size and/or shape, including, e.g., substantially spherical nanocrystals (e.g., nanodots or quantum dots), nanorods, or branched nanostructures (e.g., bipods, tripods, or nanotetrapods). In one class of embodiments, the nanostructures have an average diameter between about 1 and 4 nm and/or have a narrow size distribution.

As noted, the methods can be used to produce electronic grade Ru nanostructures having low levels of contaminants. Thus, in one class of embodiments, in the nanostructures a ratio of the Ru atom to each of one or more atoms selected from the group consisting of Cu, Fe, Cr, Zn, Ti, Mn, Au, Na, and K is greater than 1,000:1, greater than 5,000:1, greater than 10,000:1, or greater than 100,000:1, as described above. The methods optionally include determining an amount of one or more of Cu, Fe, Cr, Zn, Ti, Mn, Au, Na, and K present in the precursor and in any additive, surfactant, and/or non-coordinating solvent. Similarly, the methods can include determining an amount of one or more of Ru, Ni, Cu, Fe, Cr, Zn, Ti, Mn, Au, Na, and K present in the nanostructures.

Essentially all of the features noted for the methods above apply to these embodiments as well, as relevant; for example, with respect to limits on contaminant levels and number of contaminants limited, treatment and/or composition of the reaction vessel, washing of the nanostructures, inclusion of the nanostructures in a device, and/or the like.

Compositions produced by or useful in practicing the methods are also a feature of the invention. Thus, one general class of embodiments provides a composition including ruthenium (III) acetylacetonate and one or more ruthenium nanostructures. The composition optionally includes an additive selected from the group consisting of an oxidizing agent, a carboxylate, an acetate, and a base.

Essentially all of the features noted for the embodiments above apply to these embodiments as well, as relevant; for example, with respect to type of nanostructures, precursor, additive, surfactant, and/or non-coordinating solvent, purity of the nanostructures, and/or the like.

Nanostructures produced by any of the methods of the invention form another feature of the invention. As noted, such nanostructures can be, e.g., nanocrystals, substantially spherical nanocrystals, nanorods, branched nanostructures, and/or nanotetrapods. Also as noted, the methods of the invention can be used to produce nanostructures having a narrow size distribution. In addition, the nanocrystals are optionally substantially free of sodium, unlike the nanoparticles described in Viau et al. (2003) "Ruthenium nanoparticles: Size, shape, and self-assemblies" Chem. Mater. 15:486-494, whose synthesis entails the addition of sodium acetate.

Thus, one general class of embodiments provides a composition comprising a population of ruthenium nanostructures. The population exhibits a standard deviation in diameter of the Ru nanostructures which is less than 30% of an average diameter of the nanostructures. The standard deviation is optionally less than 20% of the average diameter, or even less than 10% of the average diameter. The size distribution of the population is preferably monomodal. The ruthenium nanostructures are substantially free of sodium; for example, the nanostructures have at most about 1 Na atom per $5\times10^4$ Ru atoms, preferably at most about 1 Na atom per $1\times10^5$ Ru atoms, e.g., as determined by surface SIMS analysis of the nanocrystals to determine Na content and calculation or Rutherford backscattering technique to determine Ru levels. As described herein, the nanostructures are optionally also substantially free of one or more additional contaminants (e.g., K, etc.).

The nanostructures can be of essentially any size, but the average diameter is optionally less than 10 nm or less than 5 nm, e.g., between about 1.0 nm and about 4.0 nm. Similarly, the nanostructures can be of essentially any shape. In one preferred class of embodiments, the nanostructures are quantum dots.

Again, essentially all of the features noted for the embodiments above apply to these embodiments as well, as relevant; for example, with respect to type of nanostructures, purity of the nanostructures, and/or the like.

Precipitation of Nanostructures

Following manipulation of nanostructures in solution (e.g., following colloidal synthesis of the nanostructures, ligand exchange, or the like), the nanostructures can be conveniently recovered from solution by centrifugation. However, when the nanostructures are synthesized and/or processed in high purity (e.g., electronic grade) solvents, the nanostructures can be more difficult to recover by centrifugation than when the nanostructures were synthesized and/or processed in solvents containing more impurities (e.g., contaminants introduced by drying the solvents with molecular sieves). This difficulty can be overcome by the addition of a small quantity of salt to the solution prior to centrifugation.

Accordingly, one general class of embodiments provides methods of recovering nanostructures from suspension. In the methods, a first solution comprising the nanostructures suspended in a solvent is provided. A salt is added to the first solution to produce a second solution, in which second solution the salt is dissolved in the solvent. The nanostructures are separated from the solvent, for example, by centrifuging the second solution at a selected acceleration factor for a selected time.

Preferably, substantially all of the nanostructures are recovered from solution. Thus, in one class of embodiments, at most 5% (e.g., at most 1% or essentially none) of the nanostructures remain in the solvent following centrifugation of the second solution at the selected acceleration factor for the selected time. As indicated above, increasing the ionic strength of the solution by adding salt facilitates recovery of the nanostructures by centrifugation. After addition of salt, the nanostructures can be essentially completely recovered from solution by centrifugation at speeds insufficient to pellet the nanostructures prior to addition of the salt. Thus, typically at least 60% (e.g., at least 70%, at least 80%, or at least 90%) of the nanostructures remain in the solvent following centrifugation of the first solution at the selected acceleration factor for the selected time. (It will be evident that, in routine practice of the methods, the first solution is typically not centrifuged prior to addition of the salt.)

The solvent can be essentially any solvent (including, e.g., a mixture of two or more solvents, such as a solubilizing solvent and a more polar precipitating solvent). Exemplary solvents include, but are not limited to, organic solvents such as alcohols (e.g., methanol or ethanol), ketones, and other heteroatom-containing organic molecules.

A wide variety of salts are known in the art and can be adapted to the practice of the present invention, including, e.g., simple, double, and complex salts and/or normal, acid, and basic salts. In one class of embodiments, the salt comprises a cation selected from the group consisting of: $NH_4^+$, $Cs^+$, $K^+$, $Na^+$, $Li^+$, $Mg^+$, $Ca^+$, $Ba^+$, and a phosphonium ion. In one class of embodiments, the salt comprises an anion selected from the group consisting of: citrate, phosphate, sulfate, acetate, chloride, nitrate, thiocyanate, carbonate, and tetraphenylborate. Exemplary salts include ammonium carbonate, ammonium acetate, and ammonium chloride.

Essentially any salt having some solubility in the solvent can be employed. However, in certain embodiments, a volatile salt is preferred (e.g., ammonium carbonate or ammonium acetate). A volatile salt can be removed from the pelleted nanostructures, e.g., under vacuum, and thus does not contaminate the recovered nanostructures. The methods optionally include removing at least a portion of any salt remaining associated with the nanostructures after the centrifugation step.

It will be evident that choice of salt can be influenced, e.g., by the intended use of the nanostructures; typically, a salt that can be substantially completely removed from the nanostructures or whose presence will not interfere with the desired application of the nanostructures is selected for use. For example, for processing of electronic grade nanostructures, salts including an ammonium ion as the cation and/or a citrate, sulfate, acetate, chloride, nitrate, thiocyanate, or carbonate ion as the anion are optionally employed. Due to their ease of removal from the nanostructures, volatile salts such as ammonium carbonate and ammonium acetate are particularly preferred for use in processing electronic grade nanostructures.

The amount of salt added to the first solution can be determined empirically. Typically, little salt is required to alter the ionic strength of the solvent enough to facilitate recovery of the nanostructures. For example, addition of a salt such as ammonium acetate to 800-1000 ppm in a solvent such as methanol is typically sufficient.

The nanostructures are optionally resuspended in fresh solvent and the salt addition and centrifugation steps repeated, e.g., to remove excess surfactant from the nanostructures. The steps can be repeated once (i.e., performed twice), or two, three, four, or more times.

Surfactants and Non-Coordinating Solvents

As noted above, one or more surfactants are typically used in a nanostructure synthesis reaction, to assist in controlling shape and/or size of the resulting nanostructures, to maintain solubility and prevent aggregation of the nanostructures, and/or the like. A number of suitable surfactants are described herein and/or known in the art and can be used singly or in various combinations. Examples include, but are not limited to, phosphines, thiols, phosphine oxides (e.g., tri-n-alkyl phosphine oxides), sulfonates, amines (e.g., oleylamine), diols (e.g., propanediol), and carboxylic acids.

Suitable phosphines include tri-n-alkyl phosphines such as trioctylphosphine (TOP) and tri-n-butyl phosphine (TBP). Suitable phosphines also include tri-alkylarylphosphines such as dodecylbenzylphosphine; in a tri-alkylarylphosphine surfactant, the phosphine is a "soft" ligand (soft ligands are typically preferable for "soft" metals), the aryl group can pi-backbond from the metal, and the alkyl group can contribute to solubility in organic solvents. Exemplary phosphines also include bidentate phosphines, e.g., diphenylphosphinoalkanes such as diphenylphosphinopropane (DPPP) and diphenylphosphinoethane (DPPE). Other exemplary bidentate phosphines include DPPB, BDPF, BIPHEP, (−)-DIOP, (−)-BINAP and (R,R)-NORPHOS (see, e.g., Son et al. (2004) "Facile synthesis of various phosphine-stabilized monodisperse palladium nanoparticles through understanding of coordination chemistry of the nanoparticles" Nano Letters 4:1147-1151).

Thiols that can be used as surfactants include, but are not limited to, alkyl thiols, aryl thiols, and alkylaryl thiols, including, e.g., monothiols, dithiols, and the like. Use of thiols, e.g., alkyl thiols, aryl thiols, or alkylaryl thiols, as surfactants is preferred in some embodiments; the thiol group is a "soft" ligand and thus typically preferable for "soft" metals, the aryl group can pi-backbond from the metal, and/or the alkyl group can contribute to solubility in organic solvents. (See, e.g., Adams et al. (1932) Org Syn Collect 1:504 and Pirmettis et al. (1996) "Synthesis and characterization of oxotechnetium(V) mixed-ligand complexes containing a tridentate N-substituted bis(2-mercaptoethyl)amine and a monodentate thiol" Inorg Chem 35:1685-1691.) In addition, use of a thiol surfactant avoids the potential for formation of undesirable metal phosphides that can result when a phosphine surfactant is employed. Polyhedral oligomeric silsesquioxanes, e.g., containing thiols or other nanostructure binding groups, can also be used as surfactants (see U.S. patent application Ser. No. 11/147,670 filed Jun. 7, 2005 by Jeffery A. Whiteford, et al. entitled "Post-deposition encapsulation of nanostructures: Compositions, devices and systems incorporating same").

A suitable surfactant (or combination of surfactants) for use with a given precursor can be determined by experimentation as is known in the art. Factors affecting choice of surfactant(s) can include, for example, reaction temperature, choice of precursor, and desired size and shape of the nanostructures to be produced. As noted, two or more surfactants can be used in a given synthesis reaction; for example, the precursor can be dissolved in TOP and injected into a larger volume of heated dodecylbenzylphosphine to initiate nanostructure growth. As another example, in one aspect, the precursor is reacted in the presence of an alkyl thiol (e.g., dodecanethiol) and a polyhedral oligomeric silsesquioxane that includes a thiol group. After synthesis of the nanostructures, surfactants coating the nanostructures are optionally exchanged for other surfactants or surface ligands. See, e.g., U.S. patent application Ser. No. 11/147,670 (supra), U.S. patent application Ser. No. 10/928,625 filed Aug. 26, 2004 by Jeffrey A. Whiteford et al. entitled "Organic species that facilitate charge transfer to or from nanostructures", and U.S. patent application Ser. No. 11/492,717 filed Jul. 24, 2006 by J. Wallace Parce et al. entitled "Nanocrystal doped matrixes." Like the surfactant in which the nanostructures were grown, such other surfactants or surface ligands optionally also contain low levels of contaminants.

In one aspect, nanostructures are synthesized by reacting precursors in the presence of one or more non-coordinating solvents. For example, a precursor can be reacted in the presence of a surfactant and a non-coordinating solvent; use of the non-coordinating solvent can, e.g., permit use of a smaller quantity and/or lower concentration of the surfactant, which can be advantageous. The non-coordinating solvent is optionally present in excess of the surfactant; for example, the volume of the non-coordinating solvent can be five or more, 10 or more, 15 or more, 20 or more, or 25 or more times the volume of the surfactant. Suitable non-coordinating solvents include alkanes (particularly long chain alkanes), alkane substituted aryl derivatives, unreactive aromatic hydrocarbons, and the like. For example, octadecane, hexadecane, phenyldodecane, phenyltetradecane (also known as tetradecylbenzene), or phenylhexadecane can be used.

EXAMPLES

It is understood that the examples and embodiments described herein are for illustrative purposes only and that various modifications or changes in light thereof will be suggested to persons skilled in the art and are to be included within the spirit and purview of this application and scope of the appended claims. Accordingly, the following examples are offered to illustrate, but not to limit, the claimed invention.

Example 1

Synthesis of Palladium Nanocrystals

The following sets forth a series of experiments that demonstrate synthesis of palladium nanostructures, using novel combinations of precursors, surfactants, and non-coordinating solvents. The resulting palladium nanocrystals have, e.g., low levels of other, contaminating metals.
Synthesis from Palladium Acetate Precursor
  General Methods
  All manipulations are carried out with strict exclusion of air and moisture by using Schlenk technique under an inert atmosphere of argon. Solvents and reagents are stored and handled in a glove box. Trioctylphosphine (TOP), min 97%, is obtained from Alfa Aesar and purified by distillation, then filtered with a 0.2 micron PTFE Octadecane is obtained from Aldrich and filtered with a 0.2 micron PTFE frit prior to use. Palladium acetate is obtained from Strem Chemicals, Inc. (Newburyport, Mass.). Solvents are electronic grade. Glassware is acid washed with aqua regia prior to use, and solvents and reagents contact only the acid-washed glassware, plastic, and/or Teflon®.

Synthesis of Pd Nanocrystals
Synthesis of Pd nanocrystals is schematically illustrated in FIG. 1. In the glove box, 0.2245 g palladium acetate and 1.0 mL trioctylphosphine (TOP) are combined in an 8 mL vial. The resulting TOP-Pd solution is heated with stirring for about two hours or until dissolved at 70° C. The solution is then drawn into a 3 mL syringe equipped with a 16 gauge needle.

A 50 mL 3-neck round bottom flask with a long condenser is set up on the Schlenk line and placed under inert gas. The flask is equipped with a thermocouple, which will be immersed in the reaction solution to monitor the solution temperature. To the flask is added 20 mL octadecane. The octadecane is heated with the temperature controller set to 100° C., then held at 100° C. under vacuum with stirring for 20 minutes, then placed under inert gas. The temperature controller is set to 320° C.

The syringe containing the TOP-Pd solution is removed from the glove box, and the TOP-Pd is immediately injected into the flask at 315° C. The temperature controller is set to 300° C. One minute after the injection, the heat source is removed from the reaction flask and the reaction solution allowed to cool. When the solution temperature reaches about 60° C., 5.0 mL hexanes are added and the product is transferred by syringe into inert vials and then into the glove box for washing.

Washing of Pd Nanocrystals
Half of the reaction solution is transferred to eight vials, with each vial receiving about 1.6 mL of reaction solution. In the glove box, 5.0 mL ethanol is added to each vial. The solution is vortexed heavily and heated briefly at 50° C. (for approximately 2 minutes), then centrifuged for 5 minutes. The supernatant is slightly colored and the precipitate is oily; if the precipitate is suspended in solution, the supernatant is removed by syringe. The precipitate is retained. Addition of 5.0 mL ethanol to each vial, vortexing, centrifugation, and retention of precipitate is repeated four times. After the last precipitation step, the precipitates are combined in one 8 mL vial with 2 mL toluene.

Figure 2:
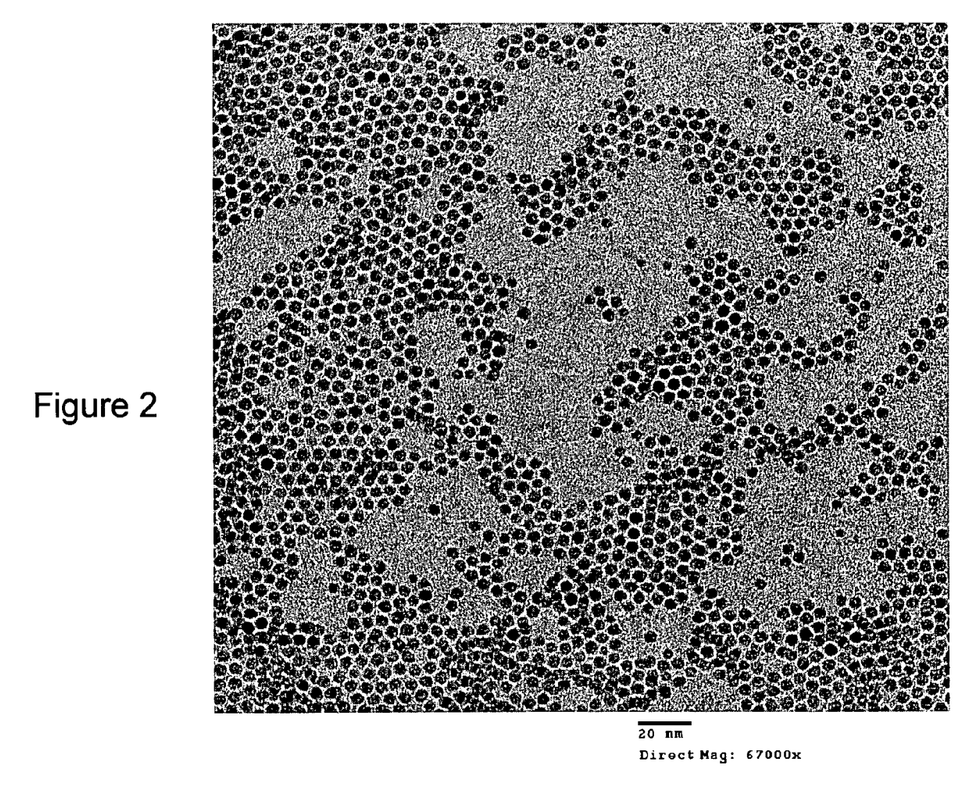
FIG. 2 shows a transmission electron micrograph of palladium nanocrystals.

Analysis of Pd Nanocrystals
A transmission electron micrograph of exemplary Pd nanocrystals is shown in FIG. 2. For determination of contaminant levels, nanocrystals were suspended in a solvent such as toluene or chlorobenzene and then filtered through a 0.2 micron PTFE frit. Quantities of Fe, Zn, Cu, Au, and Na present in the nanocrystals were determined by surface SIMS (for Na) and TXRF (for other metals) and are presented in Table 1. For TXRF analysis, measurements are typically taken at 3-5 positions on the grid and averaged. The density of the palladium quantum dots in this exemplary sample was about $2\times10^{12}/cm^2$. Since each dot includes about 1000 atoms of Pd, the density of palladium was about $2\times10^{15}$ atoms/$cm^2$. As noted, contaminant levels can be further decreased by use of quartz glassware.

TABLE 1

| Contamination level in Pd quantum dots. ||
|---|---|
| Contaminant | Level (atoms × $10^{10}/cm^2$) |
| Iron | <1 |
| Zinc | 22 |
| Copper | <3 |
| Gold | 1.5 |
| Sodium | 17 |

Synthesis from Palladium Acetylacetonate Precursor

Synthesis of Pd Nanocrystals

The following Pd-thiol in tetradecyl benzene (TDB) stock solution is prepared in a 20 mL vial in a glove box under inert atmosphere: palladium acetylacetonate, 304 mg (1.0 mM); cyclohexyl monothiol POSS (polyhedral oligomeric silsesquioxane), 536.5 mg (0.5 mM), see, e.g., compound 13 of U.S. patent application Ser. No. 11/147,670; 1-dodecane thiol, 303.0 mg (1.5 mM); and tetradecyl benzene, 10.0 mL. A stir bar is added and the TDB-Pd/thiol complex is heated while mixing for 30 minutes at 100° C. The temperature is turned down to 60° C. and the solution is allowed to mix for another 30 minutes. The solution is drawn into a 10.0 mL syringe equipped with a 16 gauge needle.

A 250 mL, 3-neck round bottom flask with a condenser is set up on a Schlenk line and the reactor is placed under inert gas. 50 mL of 99% tetradecyl benzene is added to the 250 mL 3-neck round bottom flask. The tetradecyl benzene is heated with the temperature controller set to 120° C., then held at 120° C. under vacuum with stirring for 20 minutes, then placed under inert gas. The temperature controller is set to 290° C.

The syringe containing the TDB-Pd/thiol complex is removed from the glove box, and the TDB-Pd/thiol complex is immediately injected into the flask at 290° C. The temperature controller is set to 280° C. Ten minutes after the injection, the heat source is removed from the reaction flask and the reaction solution is allowed to cool. When the reactor reaches about 60° C., the product is transferred by syringe into inert vials and then into the glove box for immediate washing.

Washing of Pd Nanocrystals

The nanostructures are washed in the glove box. Note that all solvents are of electronic grade and/or distilled. To the reaction solution (about 60 mL, theoretical yield 106 mg) in a clean 250 mL polypropylene container is added a 50/50 ratio of 90 mL isopropyl alcohol/90 mL methanol; the mixture is vortexed and centrifuged, and the supernatant is decanted. (The precipitate may be oily, and may be suspended in solution. In this case, the supernatant is removed by syringe.) The isopropyl alcohol/methanol precipitation is repeated three times or until a solid pellet is achieved. The pellet is resuspended with 30 ml of hexane. A Teflon® (30 mL) ultracentrifuge tube is filled with the suspended Pd nanostructures, capped with a solvent resistant o-ring cap, centrifuged in a 70 Ti rotor for 20 hours at 20000 rpm, and transferred to the glove box. The supernatant is removed by syringe to the level of the palladium. To the nanostructures in the same tube, 20 ml of methanol is added; the tube is vortexed and centrifuged (3000 rpm, 5 min) and the supernatant is decanted. The methanol wash is repeated, and the nanostructures are set aside for deposition.

Analysis of Pd Nanocrystals

Quantities of Na, K, Cu, Zn, Fe, and Ni present in the nanocrystals were determined by surface SIMS and TXRF and are presented in Table 2. The density of palladium was calculated to be $6.9 \times 10^{15}$ atoms/cm$^2$.

TABLE 2

Contamination level in Pd quantum dots.

| Contaminant | Level (atoms × $10^{10}$/cm$^2$) |
|---|---|
| Na | 14 |
| K | 1.7 |
| Cu | 3.9 |
| Zn | 23 |

TABLE 2-continued

Contamination level in Pd quantum dots.

| Contaminant | Level (atoms × $10^{10}$/cm$^2$) |
|---|---|
| Fe | 33 |
| Ni | <2.5 |

Example 2

Synthesis of Ruthenium Nanocrystals

The following sets forth a series of experiments that demonstrate synthesis of ruthenium nanostructures on a 1 gram scale, using a novel precursor. The resulting ruthenium nanocrystals have, e.g., low levels of other, contaminating metals.

General Methods

Manipulations are performed in a clean room. Glassware and other accessories utilized include the following: 1 L three-neck quartz flask, quartz condenser, Teflon® sleeve for condenser, quartz thermocouple adaptor, stir bar, heating mantle, thermocouple and temperature controller, adapter for condenser with 0.2 μm air filter, rubber septa (rinsed with methanol) for sealing third neck of the flask, and 5×250 mL Teflon® bottles. All the glassware and Teflon®-ware is cleaned with a ChromeEtch bath (Chromium Photomask Etchant CR14-S from Cyantek Corp.) followed by a 50% nitric acid bath and washed with plenty of deionized water between baths and after the nitric acid bath.

Chemicals and solvents used include Ru (III) acetylacetonate [Ru(acac)$_3$] 99.99%, obtained from MV Labs; ammonium nitrate 99.999%, obtained from Sigma-Aldrich; dodecane thiol min. 98%, obtained from Aldrich and purified by distillation; 1,2 propane diol E-grade, obtained from Huntsman; ammonium acetate 99.999%, obtained from Sigma-Aldrich; methanol electronic grade, obtained from Air Products; and toluene electronic grade, obtained from HTP.

Synthesis Procedure

To synthesize the nanocrystals, 6.3 g of Ru(acac)$_3$ and 1.53 g of ammonium nitrate are weighed into the quartz flask, and 700 mL of 1,2 propane diol is added into the flask. The flask is set on a heating mantle above a stir plate and heated at 80° C. under stirring for 60 minutes. After the hour at 80° C., the reaction pot is heated to 175° C. and then maintained at 175° C. for 75 min. with stirring. After the 75 min. at 175° C., the heat is removed and the reaction is allowed to cool to room temperature; an airgun is used to cool the flask.

Initial Washing to Remove Majority of 1,2 Propane Diol

About 50 mL of the reaction mixture is transferred into each of two 250 mL Teflon® bottles. About 200 mL methanol is added to both bottles. The bottles are shaken well and centrifuged to precipitate the Ru dots (e.g., at 4000 rpm for 7 min.). The supernatant is discarded, and 50 mL more of the reaction mixture is added into the Teflon® bottles. Methanol is added and the centrifugation and removal of supernatant steps are repeated. This process is repeated until about 50 mL of the reaction mixture remains in the flask and the majority of the dots are in the Teflon® bottles. Methanol is used to transfer the precipitate (dots) from the Teflon® bottles back into the quartz flask containing the residual reaction mixture, using a transfer pipet to avoid losses.

Ligand Exchange

After all the dots are transferred into the flask, 240 mL of toluene and 185 mL of distilled dodecane thiol are added into the flask. The mixture is heated at 70° C. for 1 hour under stirring, then cooled to room temperature with an airgun. The contents of the flask are transferred into 3×250 mL Teflon® bottles and centrifuged, e.g., at 4000 rpm for 5 min. The centrifugation step should separate the toluene and propane diol phases—note that only the toluene layer has the good dots; the aggregate at the bottom of the bottle is discarded while washing. If storage before final washing is necessary, the bottles are transferred to a glove box with a nitrogen atmosphere.

Final Washing

About 75 mL of the exchanged reaction mixture is transferred into each of two clean 250 mL Teflon® bottles, using a rinsed syringe and needle to remove only the supernatant. (Any precipitate in the primary bottle is discarded; it is not transferred for washing.) Methanol is added until near the neck of each bottle, then 2-3 mL of 30,000 ppm ammonium acetate solution is added. The bottles are shaken well and then centrifuged, e.g., at 4000 rpm for 5 min. About 75 mL more of the exchanged reaction mixture is transferred into the same bottles, and the addition of methanol and salt solution, the shaking, and the centrifugation are repeated. This process is repeated until all of the solution from the exchanged mixture is transferred to the Teflon® bottles and precipitated.

The precipitate is dissolved in 50 mL of toluene, shaking well. Methanol and salt solution are added, and the mixture is shaken and centrifuged. 10 mL portions of toluene are used to transfer the contents of one of the bottles into the other (in total 50 mL toluene is used). Methanol and salt solution are added, and the mixture is shaken and centrifuged. The precipitate is dissolved in 50 mL of toluene and shaken; methanol and salt solution are added, and the mixture is shaken and centrifuged. The precipitate is retained and washed once in methanol only (250 mL). The methanol is discarded, and the dots are stored as a wet pellet, e.g., in a glove box with a nitrogen atmosphere.

Analysis of Ru Nanocrystals

Figure 3:
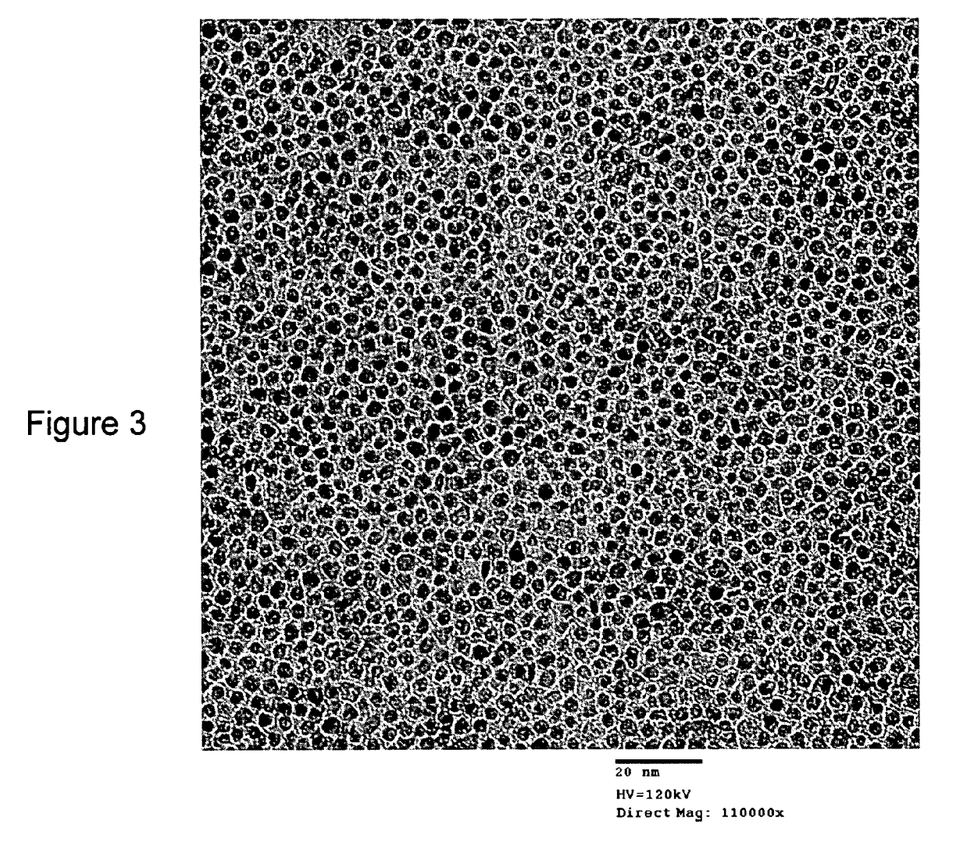
FIG. 3 shows an electron micrograph of ruthenium nanocrystals.

An electron micrograph of exemplary Ru nanocrystals is shown in FIG. 3. The nanocrystals have a size of 2.58±0.43 nm; the standard deviation in diameter of the nanostructures is therefore less than 17% of their average diameter.

For determination of contaminant levels, washed Ru quantum dots were suspended in deaerated electronic grade xylene to give a concentration of approximately 1.5 mg/mL and then filtered through a 0.2 µm filter before coating on a TXRF wafer. Quantities of Ca, Ti, Cr, Mn, Fe, Ni, Cu, Zn, Na, and K present were determined by SIMS (for Na and K) and TXRF (for other metals) and are presented in Table 3. The density of ruthenium was calculated to be $2.4\times10^{15}$ atoms/cm².

TABLE 3

Contamination level in Ru quantum dots.

| Contaminant | Level (atoms × $10^{10}$/cm²) |
|---|---|
| Ca | <13 |
| Ti | <5 |
| Cr | <3 |
| Mn | <2 |
| Fe | 13 |
| Ni | <1.4 |
| Cu | 3.5 |
| Zn | 15 |
| Na | 1.0 |
| K | 0.18 |

Example 3

Synthesis of Nickel Nanocrystals

The following sets forth a series of experiments that demonstrate synthesis of nickel quantum dots having, e.g., low levels of other, contaminating metals.

Manipulations are performed in an inert atmosphere. 730 mg of nickel cyclooctadiene is dissolved in 30 mL of distilled oleylamine at 100° C. 100 mL of distilled diphenyl ether is degassed for 20 min at 100° C. and then heated to 260° C. under nitrogen atmosphere. At this temperature, the nickel precursor dissolved in oleylamine is injected and the reaction is let come to 255° C. The reaction is stopped at this point by removing the heat source and cooling the flask containing the reaction mixture with an air gun to below 120° C. The reaction mixture is then transferred to a glove box for washing.

Washing is done using de-aerated toluene and methanol. About 8 mL of the reaction mixture is transferred into a 25 mL Teflon® tube and methanol is added along with about 1 mL of 30,000 ppm salt solution (ammonium acetate). The mixture is vortexed and centrifuged to precipitate the nanostructures (e.g., at 4000 rpm for 5 min) The supernatant is decanted, more of the reaction mixture is transferred into the same tube, and the washing procedure is continued. Typically, multiple tubes are used to cut down the time required to process the entire reaction mixture. Once all the dots in the reaction mixture are precipitated in the tube(s), the precipitate is dissolved in approximately 6 mL of toluene; vortexed; methanol and 1 mL of salt solution are added; vortexed; centrifuged and the supernatant discarded. This procedure is repeated until the volume of the pellet in the tube does not change with washing (typically 5 to 6 rounds of washing). The precipitate can then be taken into xylene for further processing.

Analysis of Ni Nanocrystals

Quantities of Na, K, Cu, Zn, and Fe present in Ni quantum dots were determined by surface SIMS and are presented in Table 4. Quantity of Ni present in the dots was also determined by surface SIMS and was $6.9\times10^{15}$ atoms/cm².

TABLE 4

Contamination level in Ni quantum dots.

| Contaminant | Level (atoms × $10^{10}$/cm²) |
|---|---|
| Na | 92 |
| K | 1.8 |
| Cu | 5.6 |
| Zn | 12 |
| Fe | 1.7 |

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A population of colloidal metal nanostructures, which colloidal nanostructures comprise a metal atom, wherein the metal atom is Ru, wherein in the nanostructures a ratio of the metal atom to each of Fe and Na atoms is greater than 5,000:1.

2. The population of claim 1, wherein in the nanostructures the ratio of the metal atom to each of one or more, two or more, three or more, four or more, five or more, or six or more atoms selected from the group consisting of Cu, Cr, Zn, Ti, Mn, Au, and K is greater than 1,000:1.

3. The population of claim 1, wherein in the nanostructures the ratio of the metal atom to each of Cu, Cr, Zn, Ti, Mn, Au, and K is greater than 1,000:1.

4. The population of claim 1, wherein in the nanostructures the ratio of the metal atom to each of one or more atoms selected from the group consisting of Cu, Cr, Zn, Ti, Mn, Au, and K is greater than 5,000:1.

5. The population of claim 4, wherein in the nanostructures the ratio of the metal atom to each of two or more, three or more, four or more, five or more, or six or more atoms selected from the group consisting of Cu, Cr, Zn, Ti, Mn, Au, and K is greater than 5,000:1.

6. The population of claim 4, wherein in the nanostructures the ratio of the metal atom to each of Cu, Fe, Cr, Zn, Ti, Mn, Au, Na, and K is greater than 5,000:1.

7. The population of claim 1, wherein in the nanostructures the ratio of the metal atom to each of one or more atoms selected from the group consisting of Cu, Fe, Cr, Zn, Ti, Mn, Au, Na, and K is greater than 10,000:1.

8. The population of claim 7, wherein in the nanostructures the ratio of the metal atom to each of two or more, three or more, four or more, five or more, six or more, seven or more, or eight or more atoms selected from the group consisting of Cu, Fe, Cr, Zn, Ti, Mn, Au, Na, and K is greater than 10,000:1.

9. The population of claim 7, wherein in the nanostructures the ratio of the metal atom to each of Cu, Fe, Cr, Zn, Ti, Mn, Au, Na, and K is greater than 10,000:1.

10. The population of claim 1, wherein in the nanostructures the ratio of the metal atom to each of one or more atoms selected from the group consisting of Cu, Fe, Cr, Zn, Ti, Mn, Au, Na, and K is greater than 100,000:1.

11. The population of claim 10, wherein in the nanostructures the ratio of the metal atom to each of two or more, three or more, four or more, five or more, six or more, seven or more, or eight or more atoms selected from the group consisting of Cu, Fe, Cr, Zn, Ti, Mn, Au, Na, and K is greater than 100,000:1.

12. The population of claim 10, wherein in the nanostructures the ratio of the metal atom to each of Cu, Fe, Cr, Zn, Ti, Mn, Au, Na, and K is greater than 100,000:1.

13. The population of claim 10, wherein in the nanostructures the ratio of the metal atom to Cu is greater than 100,000:1 and the ratio of the metal atom to Fe is greater than 100,000:1.

14. The population of claim 10, wherein in the nanostructures the ratio of the metal atom to Na is greater than 100,000:1.

15. The population of claim 10, wherein in the nanostructures the ratio of the metal atom to K is greater than 100,000:1.

16. The population of claim 1, wherein in the nanostructures the ratio of the metal atom to Fe is greater than 10,000:1, the ratio of the metal atom to Zn is greater than 10,000:1, the ratio of the metal atom to Cu is greater than 50,000:1, and the ratio of the metal atom to K is greater than 50,000:1.

17. The population of claim 1, wherein the nanostructures comprise substantially spherical nanocrystals or quantum dots.

18. A device comprising the population of claim 1.

19. The device of claim 18, wherein the device comprises a charge storage device, a memory device, or a photovoltaic device.

20. The population of claim 1, wherein the nanostructures comprise nanocrystals.

21. A monolayer array of colloidal metal nanostructures, which colloidal nanostructures comprise a metal atom, wherein the metal atom is Ru, wherein a density of the metal atom in the array is greater than $1 \times 10^{15}$ atoms/cm$^2$, and wherein a density in the array of each of Fe and Na atoms is less than $1 \times 10^{11}$ atoms/cm$^2$.

22. The monolayer array of claim 21, wherein the density in the array of each of one or more atoms selected from the group consisting of Cu, Cr, Zn, Ti, Mn, Au, and K is less than $1 \times 10^{11}$ atoms/cm$^2$.

23. The monolayer array of claim 21, wherein the density in the array of each of two or more atoms selected from the group consisting of Cu, Cr, Zn, Ti, Mn, Au, and K is less than $1 \times 10^{11}$ atoms/cm$^2$.

24. The monolayer array of claim 21, wherein the density in the array of each of three or more atoms selected from the group consisting of Cu, Cr, Zn, Ti, Mn, Au, and K is less than $1 \times 10^{11}$ atoms/cm$^2$.

25. The monolayer array of claim 21, wherein the density in the array of each of four or more, five or more, or six or more atoms selected from the group consisting of Cu, Cr, Zn, Ti, Mn, Au, and K is less than $1 \times 10^{11}$ atoms/cm$^2$.

26. The monolayer array of claim 21, wherein the density in the array of each of Cu, Fe, Cr, Zn, Ti, Mn, Au, Na, and K is less than $1 \times 10^{11}$ atoms/cm$^2$.

27. The monolayer array of claim 21, wherein Cu has a density in the array of less than $1 \times 10^{11}$ atoms/cm$^2$.

28. The monolayer array of claim 21, wherein Cu has a density in the array of less than $1 \times 10^{11}$ atoms/cm$^2$ and wherein K has a density in the array of less than $1 \times 10^{11}$ atoms/cm$^2$.

29. The monolayer array of claim 21, wherein the density in the array of each of one or more atoms selected from the group consisting of Cu, Fe, Cr, Zn, Ti, Mn, Au, Na, and K is less than $1 \times 10^{10}$ atoms/cm$^2$.

30. The monolayer array of claim 21, wherein the nanostructures comprise substantially spherical nanocrystals or quantum dots.

31. The monolayer array of claim 21, wherein the array has a density greater than about $1 \times 10^{11}$ nanostructures/cm$^2$ or greater than about $1 \times 10^{12}$ nanostructures/cm$^2$.

32. A device comprising the monolayer array of claim 21.

33. The device of claim 32, wherein the device comprises a charge storage device, a memory device, or a photovoltaic device.

34. The monolayer array of claim 21, wherein the nanostructures comprise nanocrystals.

35. A composition comprising a population of ruthenium nanostructures, wherein the population exhibits a standard deviation in diameter of the nanostructures which is less than 30% of an average diameter of the nanostructures, and wherein the ruthenium nanostructures have at most about 1 sodium atom per $5 \times 10^4$ ruthenium atoms.

36. The composition of claim 35, wherein the standard deviation is less than 20% of the average diameter.

37. The composition of claim 35, wherein the nanostructures are quantum dots.

* * * * *